US011500965B2

(12) United States Patent
Hiroe et al.

(10) Patent No.: US 11,500,965 B2
(45) Date of Patent: Nov. 15, 2022

(54) ABNORMALITY DETECTION DEVICE, ABNORMALITY DETECTION METHOD, AND NON-TRANSITORY COMPUTER-READABLE MEDIUM

(71) Applicant: MITSUBISHI HEAVY INDUSTRIES, LTD., Tokyo (JP)

(72) Inventors: Takaharu Hiroe, Tokyo (JP); Kazunari Ide, Tokyo (JP); Ryo Sase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/911,497

(22) Filed: Jun. 25, 2020

(65) Prior Publication Data
US 2020/0410042 A1    Dec. 31, 2020

(30) Foreign Application Priority Data

Jun. 28, 2019    (JP) .............................. JP2019-121210

(51) Int. Cl.
*G01M 15/14*     (2006.01)
*G06F 17/18*     (2006.01)
(Continued)

(52) U.S. Cl.
CPC .............. *G06F 17/18* (2013.01); *G01M 15/14* (2013.01); *G05B 23/024* (2013.01); *G06F 11/0754* (2013.01); *G06F 17/16* (2013.01)

(58) Field of Classification Search
CPC ...... G06F 17/18; G06F 11/0754; G06F 17/16; G05B 23/024; G01M 15/14; G01M 99/005
See application file for complete search history.

(56) References Cited

U.S. PATENT DOCUMENTS 9,311,210 B1 *  4/2016  Schwartz ............ G06F 11/1064
10,496,515 B2 * 12/2019  Maya .................... G06N 20/00
(Continued)

FOREIGN PATENT DOCUMENTS

CA    2976620 A1   8/2016
CN   107250936 A  10/2017
(Continued)

OTHER PUBLICATIONS

Wu Si-wei et al., "Prediction of mechanical properties and process parameters selection based on big data", Journal of Iron and Steel Research, vol. 28, No. 12, p. 1-4, Dec. 2016, including English-language Abstract on front page, 4 pages.

*Primary Examiner* — Stephanie E Bloss
(74) *Attorney, Agent, or Firm* — Wenderoth, Lind & Ponack, L.L.P.

(57) ABSTRACT

An abnormality detection device that detects an abnormality of a target device includes a processor that executes a process of acquiring a plurality of types of measured values of the target device, a process of calculating Mahalanobis distances of the acquired plurality of types of measured values, a process of extracting the plurality of Mahalanobis distances calculated in a past predetermined period from a point in time of evaluation of the target device and calculating a moving average value of a square value of each of the extracted Mahalanobis distances, and a process of determining whether or not an abnormality has occurred in the target device on the basis of the moving average value.

7 Claims, 13 Drawing Sheets

(51) Int. Cl.
    *G06F 17/16*    (2006.01)
    *G06F 11/07*    (2006.01)
    *G05B 23/02*    (2006.01)

(56) References Cited

U.S. PATENT DOCUMENTS

| | | | |
|---|---|---|---|
| 2005/0157327 A1* | 7/2005 | Shoji | G06F 11/0751 |
| | | | 358/1.14 |
| 2008/0198950 A1 | 8/2008 | Suyama | |
| 2010/0198555 A1* | 8/2010 | Takahama | F01D 19/00 |
| | | | 702/179 |
| 2012/0266055 A1* | 10/2012 | Zhang | G06F 11/0754 |
| | | | 714/E11.024 |
| 2014/0336985 A1* | 11/2014 | Ide | G06Q 10/06 |
| | | | 702/183 |
| 2018/0031428 A1* | 2/2018 | Uno | G01M 3/002 |
| 2019/0018402 A1* | 1/2019 | Enomoto | G05B 23/024 |
| 2019/0384255 A1* | 12/2019 | Krishnaswamy | G05B 23/024 |

FOREIGN PATENT DOCUMENTS

| | | |
|---|---|---|
| CN | 108400972 A | 8/2018 |
| JP | 5101396 | 12/2012 |
| JP | 2016-146580 | 8/2016 |
| JP | 2017-120504 | 7/2017 |
| JP | 2018-139630 | 9/2018 |
| JP | 2018-147442 | 9/2018 |
| WO | 2016/176682 A1 | 11/2016 |

\* cited by examiner

ABNORMALITY DETECTION DEVICE, ABNORMALITY DETECTION METHOD, AND NON-TRANSITORY COMPUTER-READABLE MEDIUM

BACKGROUND OF THE INVENTION

Field of the Invention

The present disclosure relates to an abnormality detection device, an abnormality detection method, and a non-transitory computer-readable medium.

The application is based on Japanese Patent Application No. 2019-121210 filed on Jun. 28, 2019, the content of which is incorporated herein by reference.

Description of Related Art

As a technique for diagnosing the soundness of an object to be inspected, a method of detecting an abnormality using a Mahalanobis Taguchi (MT) method is known. In the MT method, a unit space which is a variance-covariance matrix $Q_0$ of a plurality of measurement values y of various characteristic items in a normal state of an object to be inspected is calculated, and a Mahalanobis distance is calculated using the unit space. Further, in a case where the calculated Mahalanobis distance is large, it is indicated that there is a deviation from the unit space which is a group of normal data, and thus it can be determined that an abnormality has occurred in a characteristic item to be inspected (for example, see Japanese Unexamined Patent Application. First Publication No. 2017-120504).

Patent Documents

[Patent Document 1] Japanese Unexamined Patent Application, First Publication No. 2017-120504

SUMMARY OF THE INVENTION

In an MT method of the related art, a Mahalanobis distance is calculated by directly using a measured value y obtained from an object to be inspected. However, the measured value y includes a measurement noise w in addition to an actual value x of the object to be inspected. For this reason, a fluctuation in the actual value x of the object to be inspected may be hidden by a fluctuation in the measurement noise w. For example, it may be assumed that the measurement noise conforms to a Gaussian distribution in which an average is "0" and a variance-covariance matrix is "$\Sigma_w$," and the actual value x conforms to a Gaussian distribution in which an average is "0" and a variance-covariance matrix is "$\Sigma_x$". In this case, when "$\Sigma_x \gg \Sigma_x$", the measured value y becomes substantially equal to the measurement error w, and thus it is significantly difficult to obtain information of the actual value x from the measured value y.

In addition, as described above, a unit space is a variance-covariance matrix $Q_0$ of the measured value y. When a statistical property of a measured value $y_t$ at a new time t is the same as when it is normal, an expected value of a square value of a Mahalanobis distance is equal to the order of the measured value. When this order is set to be "m", the square value of the Mahalanobis distance conforms to a chi-square distribution of the degree of freedom m. Then, an expected value of a square value of a Mahalanobis distance is "m", and a variance of the square value of the Mahalanobis distance is "2m".

FIG. 14 is a diagram showing an example of a probability distribution of a Mahalanobis distance in an MT method of the related art.

In FIG. 14, a probability distribution of a square value of a Mahalanobis distance when the number of measured values is three (m=3) that is, the degree of freedom is "3" is shown as an example. A horizontal axis represents a square value of a Mahalanobis distance, and a vertical axis represents a probability density. In the example of FIG. 14, the square value of the Mahalanobis distance has an average value of "3", but the distribution has a heavy right tail, which is distributed from "0" to "20". When the range of a distribution is wide in this manner, it is difficult to determine whether a target device is normal or abnormal from the value of the Mahalanobis distance. For example, it may be assumed that the square value of the Mahalanobis distance at a certain time t is "5". In this case, even when it is already known that an average value of the square values of the Mahalanobis distances is "3", "5" is a value that can be taken according to the probability distribution shown in FIG. 14, and thus it cannot be determined that the target device is abnormal. Therefore, when the square value of the Mahalanobis distance is not a value which is extremely outside of the range (20 or greater in the example of FIG. 14), it cannot be determined that the target device is obviously abnormal. Therefore, it is difficult to capture a minute fluctuation in a measured value x, for example, even when a variance-covariance matrix $\Sigma_w$ of a measurement noise w is "0" by only using a Mahalanobis distance in the related art, and thus there is a possibility that the accuracy of detection of an abnormality of a target device will be reduced. In addition, there is a possibility that the accuracy of detection will be further reduced when a measurement noise w is generated.

The present disclosure is contrived in view of such a problem and provides an abnormality detection device, an abnormality detection method, and a non-transitory computer-readable medium which are capable of detecting an abnormality of a target device with a high level of accuracy.

In order to solve the above-described problem, the present disclosure adopts the following means.

According to a first aspect of the present disclosure, an abnormality detection device that detects an abnormality of a target device includes a processor that executes a process of acquiring a plurality of types of measured values of the target device, a process of calculating Mahalanobis distances of the acquired plurality of types of measured values, a process of extracting a plurality of Mahalanobis distances calculated in a past predetermined period from a point in time of evaluation of the target device and calculating a moving average value of a square value of each of the extracted Mahalanobis distances, and a process of determining whether or not an abnormality has occurred in the target device on the basis of the moving average value.

According to a second aspect of the present disclosure, in the abnormality detection device according to the first aspect, the processor determines that the target device is abnormal in a case where a square root of the moving average value is larger than a predetermined threshold value.

According to a third aspect of the present disclosure, in the abnormality detection device according to the first or second aspect, the processor sets the predetermined period so as to match an operation cycle of the target device that periodically performs a repetitive operation.

According to a fourth aspect of the present disclosure, in the abnormality detection device according to the first or second aspect, the processor extracts a plurality of Mahalanobis distances calculated in a period matching an operation state of the target device at the point in time of evaluation among the plurality of Mahalanobis distances calculated in the predetermined period when the moving average value is calculated.

According to a fifth aspect of the present disclosure, an abnormality detection device that detects an abnormality of a target device includes a processor that executes a process of acquiring a plurality of types of measured values of the target device, a process of acquiring a component for each singular vector of a matrix based on the acquired measured values, a process of extracting a plurality of components acquired in a past predetermined period from a point in time of evaluation of the target device and calculating a moving average value of a square value of each of the extracted components, and a process of determining whether or not an abnormality has occurred in the target device on the basis of the moving average value.

According to a sixth aspect of the present disclosure, in the abnormality detection device according to the fifth aspect, the processor further executes a process of calculating a Mahalanobis distance based on the moving average value and determines that the target device is abnormal in a case where the Mahalanobis distance calculated on the basis of the moving average value is larger than a predetermined threshold value in the process of determining whether or not an abnormality has occurred.

According to a seventh aspect of the present disclosure, an abnormality detection device that detects an abnormality of a target device includes a processor that executes a process of acquiring a plurality of types of measured values of the target device, a process of calculating a component for each singular vector of a matrix based on the acquired measured values, a process of calculating a Mahalanobis distance of the calculated component, a process of extracting a plurality of Mahalanobis distances calculated in a past predetermined period from a point in time of evaluation of the target device and calculating a moving average value of a square value of each of the extracted Mahalanobis distances, and a process of determining whether or not an abnormality has occurred in the target device on the basis of the moving average value.

According to an eighth aspect of the present disclosure, an abnormality detection method of detecting an abnormality of a target device includes acquiring a plurality of types of measured values of the target device, calculating Mahalanobis distances of the acquired plurality of types of measured values, extracting a plurality of Mahalanobis distances calculated in a past predetermined period from a point in time of evaluation of the target device and calculating a moving average value of a square value of each of the extracted Mahalanobis distances, and determining whether or not an abnormality has occurred in the target device on the basis of the moving average value.

According to a ninth aspect of the present disclosure, a non-transitory computer-readable medium stores a program which causes a computer of an abnormality detection device detecting an abnormality of a target device to execute a process of acquiring a plurality of types of measured values of the target device, a process of calculating Mahalanobis distances of the acquired plurality of types of measured values, a process of extracting a plurality of Mahalanobis distances calculated in a past predetermined period from a point in time of evaluation of the target device and calculating a moving average value of a square value of each of the extracted Mahalanobis distances, and a process of determining whether or not an abnormality has occurred in the target device on the basis of the moving average value.

According to an abnormality detection device, an abnormality detection method, and a non-transitory computer-readable medium according to at least one aspect described above, it is possible to detect abnormality of a target device with a high level of accuracy.

DETAILED DESCRIPTION OF THE INVENTION

First Embodiment

Hereinafter, an abnormality detection system 1 and an abnormality detection device 10 according to a first embodiment of the present disclosure will be described with reference to FIGS. 1 to 5.

(Overall Configuration)

Figure 1:
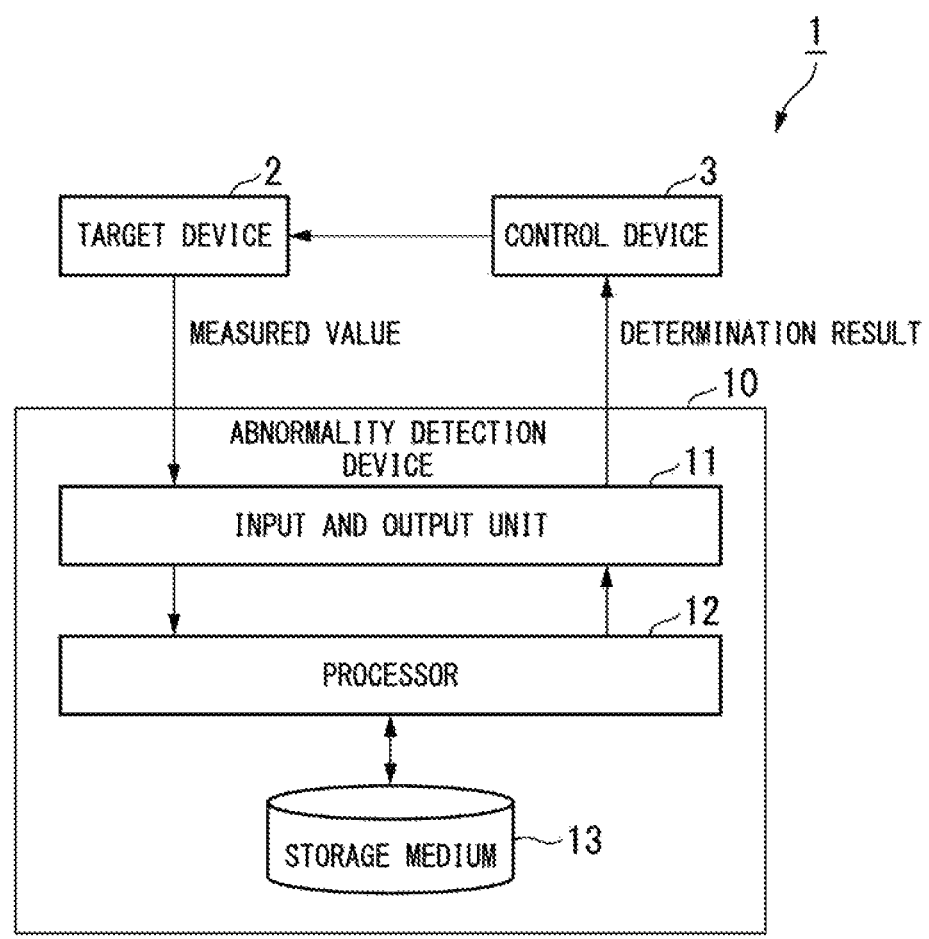
FIG. 1 is a diagram showing the overall configuration of an abnormality detection system according to a first embodiment.

FIG. 1 is a diagram showing the overall configuration of the abnormality detection system according to the first embodiment.

As shown in FIG. 1, the abnormality detection system 1 includes a target device 2, a control device 3, and an abnormality detection device 10.

The target device 2 is a target device for diagnosis of an abnormality in the abnormality detection system 1. The target device 2 according to the present embodiment is a device constituting a gas turbine combined period power plant such as a gas turbine, a steam turbine, and a boiler. In addition, the target device 2 may be a device constituting another power plant such as a wind power plant, an environmental plant, or a chemical plant. Further, the target device 2 may be a mechanical device such as a machine tool or an industrial robot.

The control device 3 generates a control signal for controlling the target device 2. The target device 2 is operated in accordance with a control signal of the control device 3.

The abnormality detection device 10 receives various signals (measured values) from a sensor, not shown in the drawing, of the target device 2 to perform an abnormality determination process of detecting an abnormality of the target device 2. In addition, the abnormality detection device 10 transmits a determination result of the target device 2 to the control device 3. Meanwhile, in a case where the control device 3 has received a determination result indicating that the target device 2 is abnormal, the control device performs control for eliminating an abnormal state of the target device 2. In a case where the target device 2 is a gas turbine, the control device 3 may perform control for reducing the supply of fuel in order to reduce an output of the gas turbine.

In addition, the control device 3 may perform control for notifying an operator of the target device 2 that an abnormality has been detected. Here, the notification control is transmitting a message indicating an abnormality has been detected to an operator or displaying the detection of an abnormality on an operation screen of the operator.

In addition, as shown in FIG. 1, the abnormality detection device 10 includes an input and output unit 11, a processor 12, and a storage medium 13.

The input and output unit 11 receives inputs of a plurality of types of measured values related to the target device 2 for each predetermined sampling cycle. In addition, the input and output unit 11 outputs a determination result of the target device 2 to the control device 3.

The measured values include values of state amounts of the target device 2. Examples of the state amounts include an atmospheric temperature, an atmospheric pressure, air temperatures and air pressures in an inlet and an outlet of a compressor, a pressure and a temperature of fuel in a combustor, temperatures and pressures of combustion gas in an inlet and an outlet of a gas turbine, an output of a gas turbine, a rotational speed of a rotating shaft, a vibration, and the like. In addition, the measured values may include a control signal transmitted to the target device 2 by the control device 3.

The processor 12 controls the overall operation of the abnormality detection device 10. The processor 12 according to the present embodiment performs an abnormality detection process of the target device 2 on the basis of a measured value acquired through the input and output unit 11.

The storage medium 13 is connected to the processor 12. The storage medium 13 stores various data acquired and generated in an abnormality detection process by the processor 12.

(Functional Configuration of Abnormality Detection Device)

Figure 2:
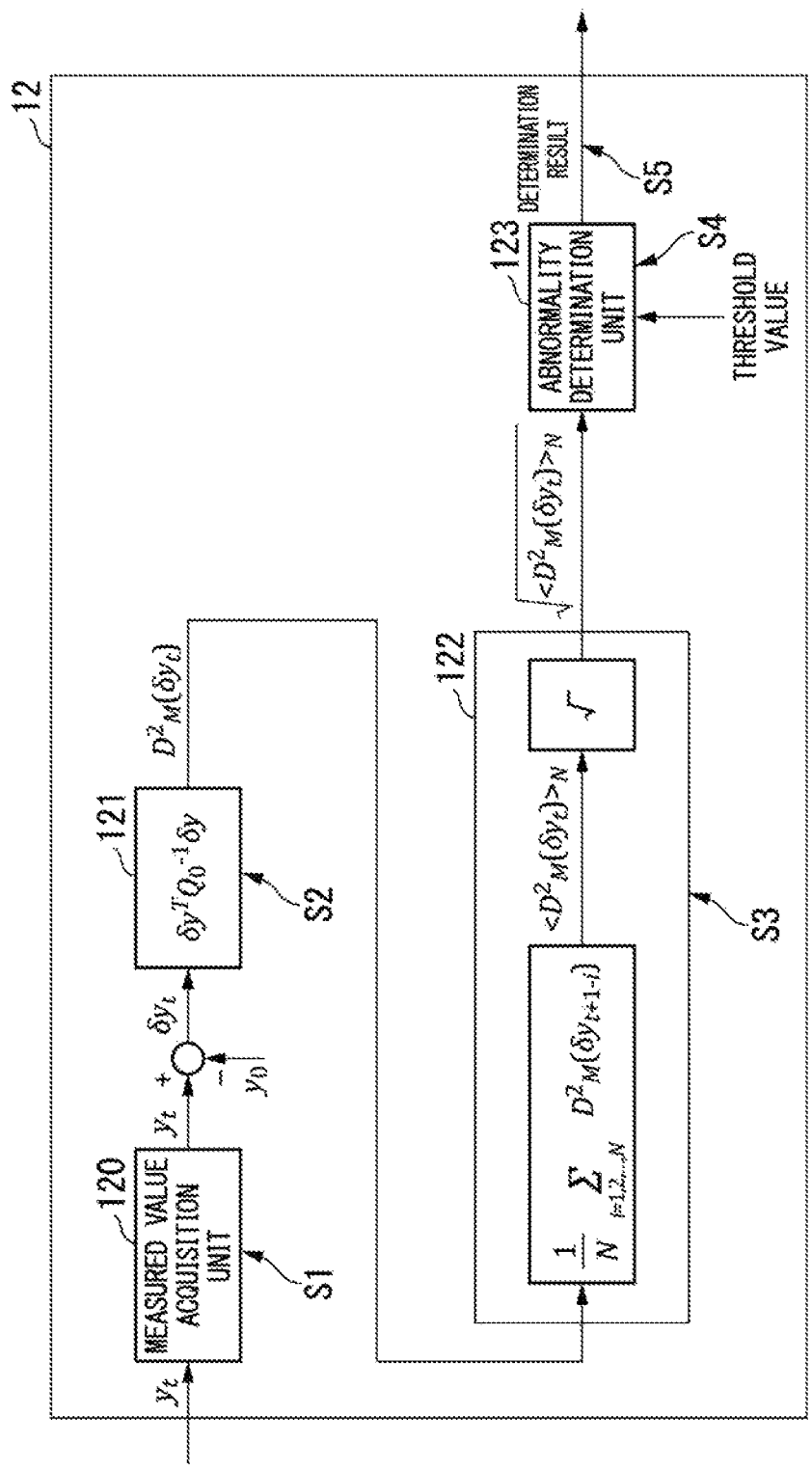
FIG. 2 is a diagram showing a functional configuration of the abnormality detection device according to the first embodiment.

FIG. 2 is a diagram showing a functional configuration of the abnormality detection device according to the first embodiment.

As shown in FIG. 2, the processor 12 of the abnormality detection device 10 is operated in accordance with a predetermined program to perform functions as a measured value acquisition unit 120, a Mahalanobis distance calculation unit 121, a moving average calculation unit 122, and an abnormality determination unit 123.

The measured value acquisition unit 120 executes a process S1 of acquiring a plurality of types of measured values $y_t$ at a certain time t (a point in time of evaluation) from the target device 2 (measured value acquisition process).

The Mahalanobis distance calculation unit 121 executes a process S2 of calculating Mahalanobis distances of the plurality of types of measured values $y_t$ acquired by the measured value acquisition unit 120 (Mahalanobis distance calculation process).

Meanwhile, in the present embodiment, it is assumed that a unit space used for calculation of a Mahalanobis distance has already been created. The unit space is a variance-covariance matrix $Q_0$ of a measured value y acquired when the target device 2 is in a normal state, and is expressed by the following Equation (1).

[Math. 1]

$$y_0 = E[y]$$
$$Q_0 = E[(y-y_0)^T(y-y_0)] \qquad (1)$$
$$= \Sigma_x + \Sigma_w$$

In addition, as described above, the measured value y includes a measurement noise w in addition to an actual value x of an object to be inspected. It is assumed that a measurement noise conforms to a Gaussian distribution in which an average is "0" and a variance-covariance matrix is "$\Sigma_w$", and the actual value x confirms to a Gaussian distribution in which an average is "0" and a variance-covariance matrix is "$\Sigma x$". In this case, the variance-covariance matrix $Q_0$ can also be expressed by a variance-covariance matrix EX of the actual value x and the variance-covariance matrix IN of the measurement noise w as shown in Equation (1) shown above.

The Mahalanobis distance calculation unit 121 calculates a Mahalanobis distance of a measured value $y_t$ in the Mahalanobis distance calculation process S2. Meanwhile, $\delta y_t$ obtained by the following Equation (2) is a difference ("$y_t - y_0$") between a measured value $y_t$ acquired at a time t and an average value $y_0$ of measured values y used in a unit space. Alternatively, $\delta y_t$ may be a difference between a measured value $y_t$ acquired at a time t, and an expected value of the measured value $y_t$ at the time t.

[Math. 2]

$$D_M(\delta y_t) = \sqrt{\delta y_t^T Q_0^{-1} \delta y_t} \qquad (2)$$

In addition, the Mahalanobis distance calculation unit 121 stores and accumulates calculated Mahalanobis distances in the storage medium 13. Meanwhile, in the next processing of the moving average calculation unit 122, a square value of a Mahalanobis distance is used. For this reason, the Mahalanobis distance calculation unit 121 according to the present embodiment may calculate a square value ("$D_M^2(\delta y_t)$") of a Mahalanobis distance as shown in FIG. 2 and store the calculated square value in the storage medium 13.

The moving average calculation unit 122 executes a process S3 of extracting a plurality of Mahalanobis distances calculated in the past predetermined period from the time t and calculating a moving average value of respective square values of the extracted Mahalanobis distances (moving average calculation process). Meanwhile, in the present embodiment, the number of samples N of a Mahalanobis distance used for taking a moving average is set in advance. For this reason, the predetermined period represents a period from a time t at which the latest Mahalanobis distance is calculated into the past over N steps.

Meanwhile, as described above, in a case where the order of a measured value y is m, a square value of a Mahalanobis distance conforms to a chi-square distribution of the degrees of freedom m. Then, an average of square values of Mahalanobis distances is expressed by the following Equation (3), and a variance is expressed by the following Equation (4).

[Math. 3]

$$E[D_M^2(\delta y_t)] = m \quad (3)$$

[Math. 4]

$$E[(D_M^2(\delta y_t) - E[D_M^2(\delta y_t)])^2] = 2m \quad (4)$$

In the present embodiment, the moving average calculation unit 122 extracts N Mahalanobis distances in order from the latest Mahalanobis distance among a plurality of Mahalanobis distances stored in the storage medium 13. For example, when "N=10", a Mahalanobis distance calculated at each of times t, t−1, t−2, . . . , and t−9 is extracted. In addition, the moving average calculation unit 122 calculates an average of square values of the extracted N Mahalanobis distances as shown in the following Equation (5).

[Math. 5]

$$\langle D_M^2(\delta y_t) \rangle_N = \frac{1}{N} \sum_{i=1,2,\ldots,N} D_M^2(\delta y_{t+1-i}) \quad (5)$$

In this case, the sum of N square values of Mahalanobis distances conforms to a chi-square distribution of the degree of freedom m×N. As a result, an average and a variance of moving average values are expressed as the following Equations (6) and (7).

[Math. 6]

$$E[\langle D_M^2(\delta y_t) \rangle_N] = \frac{m \times N}{N} = m \quad (6)$$

[Math. 7]

$$E\left[(\langle D_M^2(\delta y_t) \rangle_N - E[\langle D_M^2(\delta y_t) \rangle_N])^2\right] = \frac{2m}{N} \quad (7)$$

In addition, the moving average calculation unit 122 outputs a square root of a moving average value to the abnormality determination unit 123 as a value for determining an abnormality as shown in FIG. 2.

The abnormality determination unit 123 executes an abnormality determination process S4 of determining whether or not an abnormality of the target device 2 has occurred on the basis of the moving average value calculated by the moving average calculation unit 122.

Specifically, the abnormality determination unit 123 compares the square root of the moving average value which is output from the moving average calculation unit 122 with a predetermined threshold value to determine whether or not an abnormality has occurred. In a case where the square root of the moving average value is larger than the predetermined threshold value, the abnormality determination unit 123 determines that an abnormality has occurred in the target device 2. On the other hand, in a case where the square root of the moving average value is equal to or less than the predetermined threshold value, the abnormality determination unit 123 determines that the target device 2 is normal.

In addition, the abnormality determination unit 123 executes a process S5 of transmitting a determination result to the control device 3 (determination result transmission process).

In an MT method, when the value of a Mahalanobis distance becomes extremely larger than usual, it is determined that the target device is abnormal. However, the value of a Mahalanobis distance fluctuates continuously, and thus it is not easy to perform determination from an instantaneous value of the Mahalanobis distance. For this reason, in the present embodiment, as described above, a value used for determination of an abnormality is smoothed using a chi-square distribution. Specifically, in the processes S3 and S4, a value used for determination of an abnormality is smoothed by obtaining a square root of a moving average value of square values of Mahalanobis distances. Here, comparison between a simulation result in a case where smoothing has been performed in the abnormality detection device 10 according to the present embodiment and a simulation result in a case where an MT method of the related art has been used will be described in detail with reference to FIG. 3. Meanwhile, in this simulation, it is assumed that a Mahalanobis distance is calculated from three measured values y, and the number of samples N used for taking a moving average is set to "10".

Figure 3:
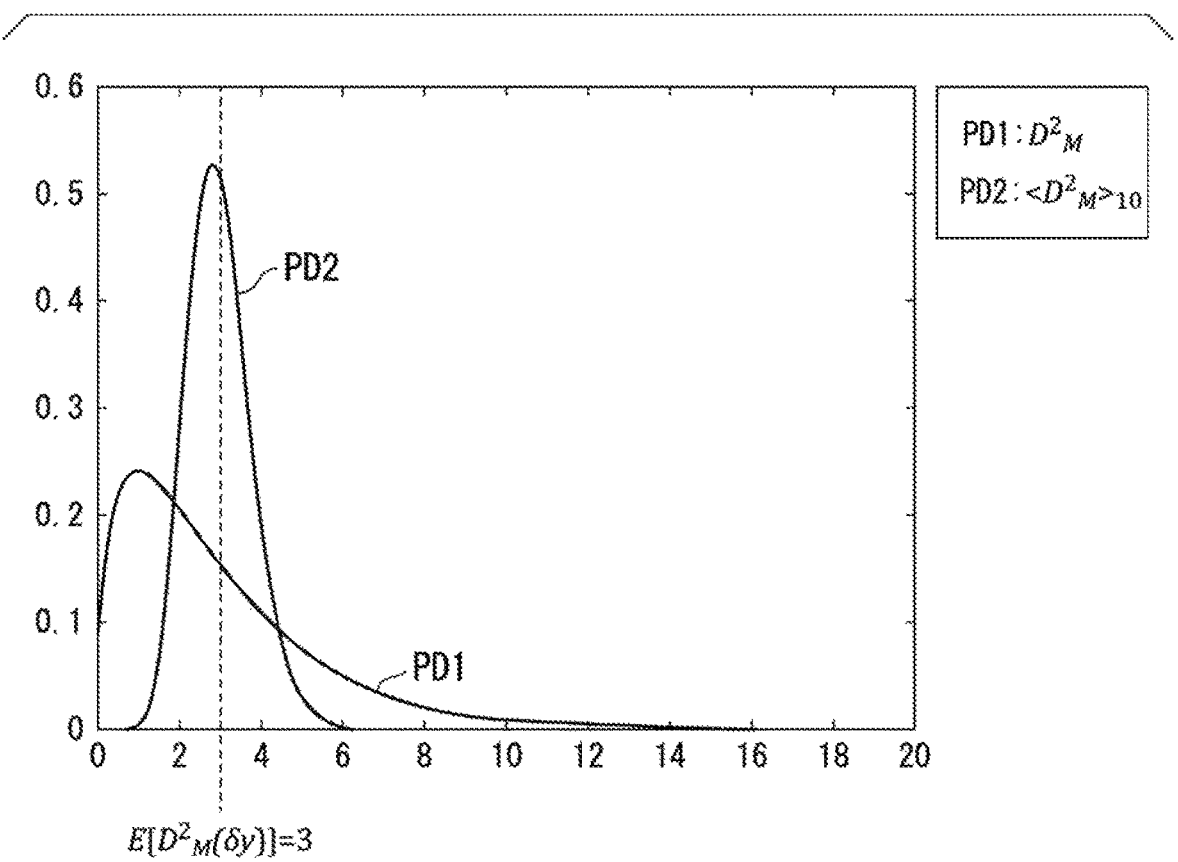
FIG. 3 is a first diagram showing an example of simulation results obtained by the abnormality detection device according to the first embodiment.

FIG. 3 is a first diagram showing an example of a simulation result obtained by the abnormality detection device according to the first embodiment.

Figure 14:
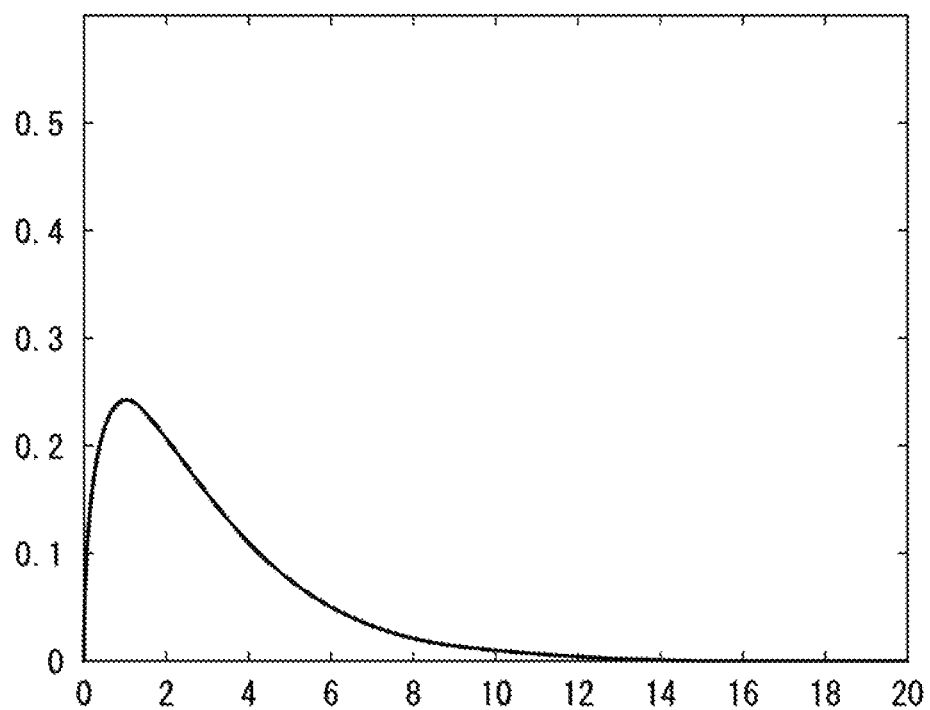
FIG. 14 is a diagram showing an example of a probability distribution of a Mahalanobis distance in an MT method of the related art.

In FIG. 3, examples of probability distributions PD1 and PD2 of square values of Mahalanobis distances which are calculated from three measured values y are shown. A horizontal axis represents a square value of a Mahalanobis distance, and a vertical axis represents a probability density. The probability distribution PD1 is a probability distribution of "a square value of a Mahalanobis distance" in an MT method of the related art described in FIG. 14. In addition, the probability distribution PD2 is a probability distribution of "a moving average value of square values of Mahalanobis distances" obtained by executing the above-described process S3.

As described above, a square value of a Mahalanobis distance conforms to a chi-square distribution of the degree of freedom m, and thus an average is "m", and a variance is "2m". Therefore, in a case where the degree of freedom is "3", an average (expected value) of square values of Mahalanobis distances in an MT method of the related art is "3" and a variance is "6". A probability density function of a chi-square distribution has a heavy distribution on a right tail, and thus a variance has a large value.

On the other hand, when a moving average of N square values of Mahalanobis distances is taken as in the present embodiment, an average is "m" as shown in Equation (6) described above, and a variance is "2m/N" as shown in Equation (7) described above. Therefore, a variance of N average values of square values of the Mahalanobis distances obtained in the process S3 is "1/N" of the variance of the square values of the Mahalanobis distances.

In this simulation. "N=10", and thus a variance of moving averages of square values of Mahalanobis distances is "0.6". In this manner, the moving average value obtained in the above-described process S3 can be made to be smaller than a variance ("6") of square values of Mahalanobis distances in an MT method of the related art. When a variation in a value used for determination of an abnormality is small, sensitivity for an abnormal value is improved. For this reason, the abnormality detection device 10 according to the present embodiment can increase the accuracy of detection of an abnormality of the target device 2 over that in an MT method of the related art by performing smoothing using the above-described chi-square distribution.

Further, in the related art, it is known that a moving average is used when data is instantaneously smoothed. For example, it is conceivable that a Mahalanobis distance be averaged and smoothed. Here, comparison between a simulation result in a case where smoothing has been performed in the abnormality detection device 10 according to the present embodiment and a simulation result in a case where smoothing in the related art has been performed (a case where smoothing has been performed by simply averaging a Mahalanobis distance) will be described in detail with reference to FIGS. 4 and 5. Meanwhile, in this simulation, similarly to the above-described example, it is assumed that a Mahalanobis distance is calculated from three measured values y, and the number of samples N used for taking a moving average is set to "10".

Figure 4:
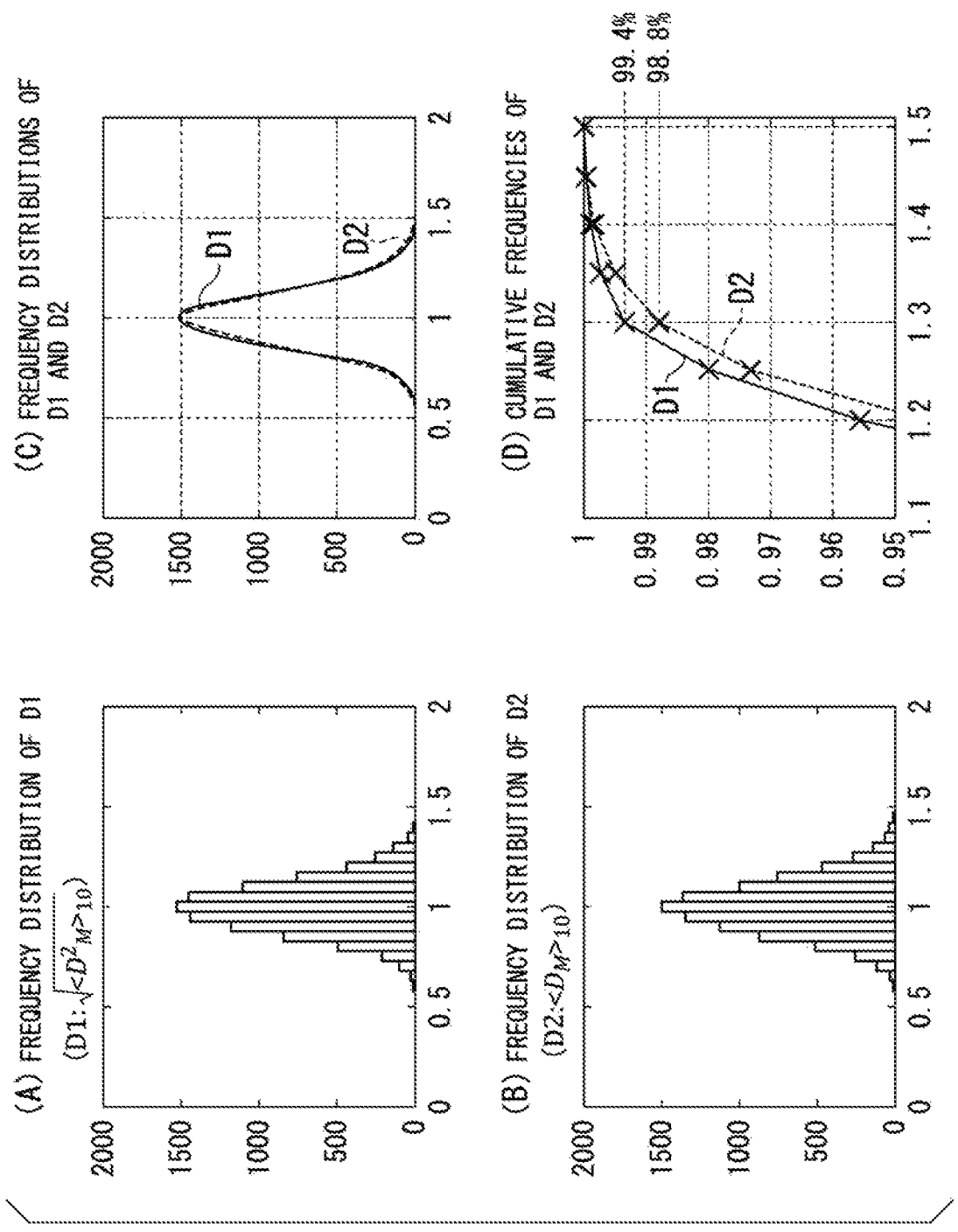
FIG. 4 is a second diagram showing an example of simulation results obtained by the abnormality detection device according to the first embodiment.

FIG. 4 is a second diagram showing an example of simulation results obtained b, the abnormality detection device according to the first embodiment.

In FIG. 4, a simulation result obtained by a smoothing method according to the present embodiment and a simulation result obtained by a smoothing method according to the related art are shown for a case where a variation in a measured value y conforms to a normal distribution. In this simulation, a Mahalanobis distance is calculated by simulating three measured values $y_i$ (i=1, 2, 3) with random numbers of a normal distribution as shown in the following Equation (8).

[Math. 8]

$$\delta y_i \sim N(0,1),\ i=1,2,3 \qquad (8)$$

FIG. 4(A) shows a frequency distribution of values obtained by a smoothing process (the process S3 in FIG. 2) according to the present embodiment, that is, values D1 ("$\sqrt{(<D_M^2>_{10})}$") obtained by taking a square root of a moving average value of square values of Mahalanobis distances in a bar graph.

FIG. 4(B) shows a frequency distribution of values obtained by a smoothing process in the related art, that is, values ("$<D_M>_{10}$") obtained by taking a moving average of Mahalanobis distances in a bar graph. Meanwhile, a horizontal axis in each of the graphs of FIGS. 4(A) and (B) is normalized so that an average value is set to "1".

FIG. 4(C) shows frequency distributions displayed as respective curves for comparison between a value D1 and a value D2.

FIG. 4(D) is a graph showing cumulative frequencies of values D1 and D2 according to the present embodiment. A value deviating from regularity has meaning in determining an abnormality, and attention has to be paid to the heaviness (thickness) of a tail of a distribution. In the simulation result shown in FIG. 4(D), a probability that the horizontal axis exceeds "1.3" (1.3 times an expected value) is "0.6%" for the value D1, whereas the probability is "1.2%" for the value D2. In this manner, a stationary variation becomes smaller by performing a smoothing process according to the present embodiment than when a smoothing process according to the related art is performed, which is advantageous to the detection of a deviation value.

Figure 5:
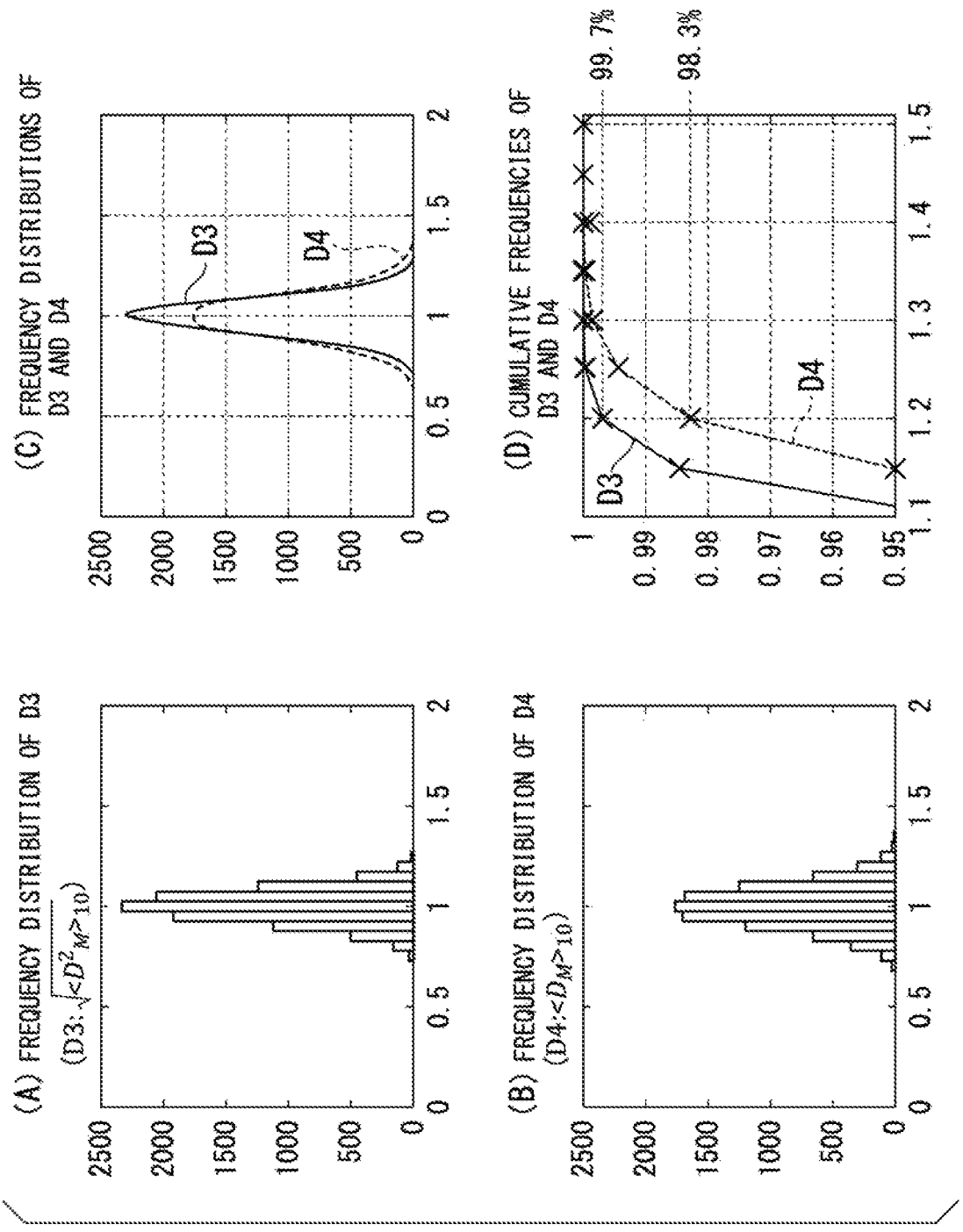
FIG. 5 is a third diagram showing an example of simulation results obtained by the abnormality detection device according to the first embodiment.

FIG. 5 is a third diagram showing an example of simulation results obtained by the abnormality detection device according to the first embodiment.

In FIG. 5, a simulation result obtained by a smoothing method according to the present embodiment and a simulation result obtained by a smoothing method according to the related art are shown for a case where a variation in a measured value y conforms to a uniform distribution. In this simulation, a Mahalanobis distance is calculated by simulating three measured values $y_i$ (i=1, 2, 3) with random numbers of a uniform distribution as shown in the following Equation (9).

[Math. 9]

$$\delta y_i \sim \text{Unif}(-1,1),\ i=1,2,3 \qquad (9)$$

FIG. 5(A) shows a frequency distribution of values obtained by a smoothing process (the process S3 in FIG. 2) according to the present embodiment, that is, values D3 ("$\sqrt{(<D_M^2>_{10})}$") obtained by taking a square root of a moving average value of square values of Mahalanobis distances in a bar graph.

FIG. 5(B) shows a frequency distribution of values obtained by a smoothing process in the related art, that is, values D4 ("$<D_M>_{10}$") obtained by taking a moving average of Mahalanobis distances in a bar graph. Meanwhile, a horizontal axis in each of the graphs of FIGS. 5(A) and (B) is normalized so that an average value is set to "1".

FIG. 5(C) shows frequency distributions displayed as curves for comparison between a value D3 and a value D4.

FIG. 5(D) is a graph showing cumulative frequencies of values D3 and D4 according to the present embodiment. In the simulation result shown in FIG. 5(D), a probability that the horizontal axis exceeds "1.2" (1.2 times an expected value) is "0.3%" for the value D3 and is "1.7%" for the value D4. In this manner, a stationary variation becomes smaller by performing the smoothing process according to the present embodiment than when the smoothing process according to the related art is performed, which is advantageous to the detection of a deviation value. In addition, the smoothing process according to the present embodiment can more effectively supply a variation in a case where a measured value y conforms to a uniform distribution (FIG. 5) than in a case where a measured value y conforms to a normal distribution (FIG. 4).

Further, it may be assumed that Mahalanobis distance values of 10 points in a certain period are{1,1,1,1,1,1,1,1, 1,1}. In this case, when a moving average of Mahalanobis distances is simply taken by a smoothing process of the related art, a value obtained is "2" as shown in the following Equation (10).

[Math. 10]

$$1+1+1+1+1+1+1+1+11/10=2 \qquad (10)$$

On the other hand, when a square root of a moving average value of square values of Mahalanobis distances is obtained by the smoothing process according to the present embodiment, a value to be obtained is "3.6" as shown in the following Equation (11).

[Math. 11]

$$\sqrt{\frac{1^2+1^2+1^2+1^2+1^2+1^2+1^2+1^2+1^2+11^2}{10}} = 3.6 \quad (11)$$

Thus, in the smoothing process according to the related art, a variation in a Mahalanobis distance is suppressed by a moving average, but an abnormal value ("11" in the above-described example) is smoothed into a normal value, which leads to a possibility that the sensitivity of detection of an abnormal value will be reduced. However, in the smoothing process according to the present embodiment, a square root is taken after taking a moving average of square values of Mahalanobis distances, and thus it is possible to obtain a significant effect of suppressing decrease in the sensitivity of detection of an abnormal value while suppressing variation in a Mahalanobis distance.

Operational Effects

As described above, the abnormality detection device 10 according to the present embodiment includes the processor 12 that executes a measured value acquisition process S1 of acquiring a plurality of types of measured values y of the target device 2, a Mahalanobis distance calculation process S2 of calculating Mahalanobis distances of the acquired plurality of types of measured values y, a moving average calculation process S3 of extracting a plurality of Mahalanobis distances calculated in the past predetermined period from a point in time t of evaluation of the target device 2 and calculating a moving average value of square values of the extracted Mahalanobis distances, and an abnormality determination process S4 of determining whether or not an abnormality has occurred in the target device 2 on the basis of the moving average value.

Thereby, the abnormality detection device 10 can reduce a variance of values used for the abnormality determination process S4, and thus it is possible to improve sensitivity for a deviation value (a value indicating an abnormality). As a result, the abnormality detection device 10 can detect an abnormality of the target device 2 with a high level of accuracy.

In addition, the processor 12 of the abnormality detection device 10 determines that an abnormality has occurred in the target device 2 in a case where a square root of a moving average value is larger than a predetermined threshold value in the abnormality determination process S4.

Thereby, the abnormality detection device 10 can use a value obtained by a smoothing process (moving average calculation process S3) in the abnormality determination process S4, similar to a Mahalanobis distance in an MT method of the related art.

Second Embodiment

Next, an abnormality detection system 1 and an abnormality detection device 10 according to a second embodiment of the present disclosure will be described with reference to FIGS. 6 and 7.

Components in common with those in the first embodiment will be denoted by the same reference numerals and signs, and detailed description thereof will be omitted.

Figure 6:
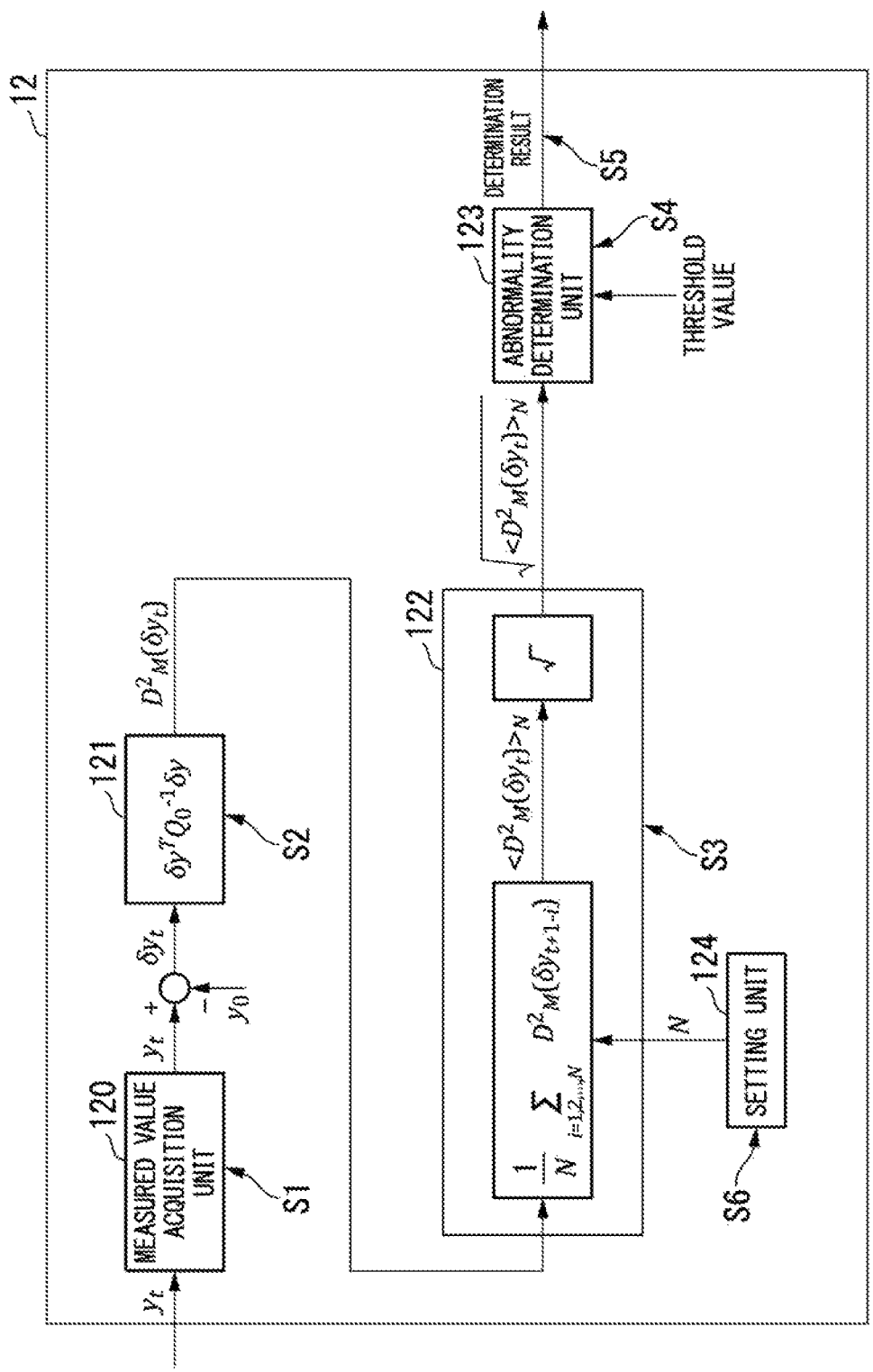
FIG. 6 is a diagram showing a functional configuration of an abnormality detection device according to a second embodiment.

FIG. 6 is a diagram showing a functional configuration of the abnormality detection device according to the second embodiment.

As shown in FIG. 6, a processor 12 of the abnormality detection device 10 according to the present embodiment further has a function of a setting unit 124.

The setting unit 124 executes a process S6 of setting a predetermined period for extracting a Mahalanobis distance for calculating a moving average (setting process) so as to match an operation cycle of a target device 2 that periodically performs a repetitive operation.

Figure 7:
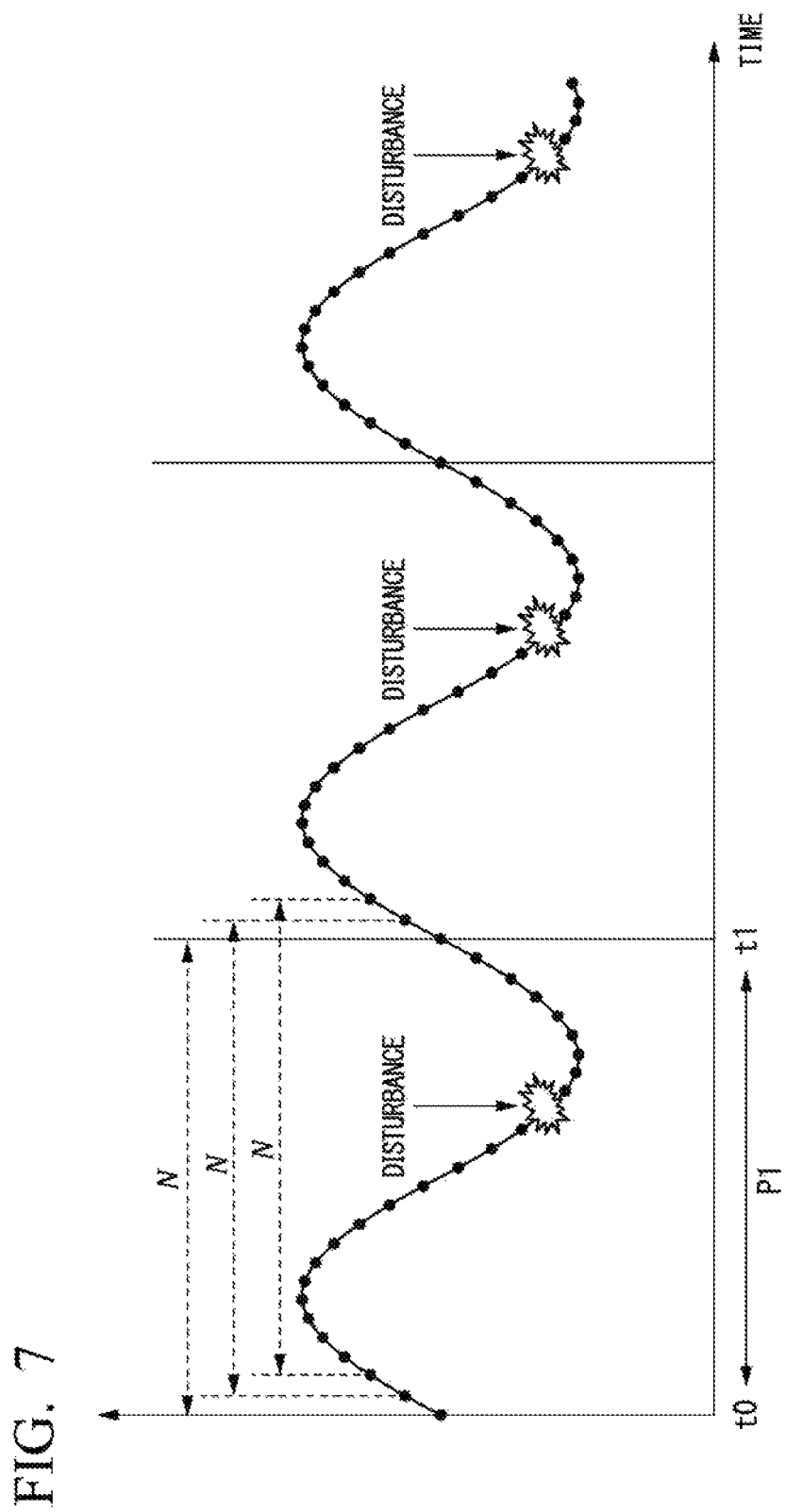
FIG. 7 is a diagram showing an example of an operation cycle of a target device according to the second embodiment.

FIG. 7 is a diagram showing an example of an operation cycle of a target device according to the second embodiment.

For example, it is assumed that the target device 2 is a turbine of a wind turbine for wind power generation. This turbine is repeatedly operated so as to rotate once every fixed time P1 as shown in FIG. 7. In this case, the setting unit 124 sets a period from a time t which is a point in time of evaluation to a time before a fixed time P1 as a predetermined period for extracting a Mahalanobis distance.

As shown in FIG. 7, disturbance may periodically occur in the turbine due to unbalance of a load, or the like. In the present embodiment, a period for obtaining a moving average is set in accordance with an operating cycle of the turbine (time P1), and thus a moving average calculation unit 122 can extract a Mahalanobis distance having such periodic disturbance reflected thereon and use the extracted Mahalanobis distance for the calculation of a moving average whenever a moving average value is calculated. That is, conditions to be applied to the turbine from the outside for one operation are uniformly used for the calculation of a moving average. Thereby, the abnormality detection device 10 according to the present embodiment can further reduce a variation in a Mahalanobis distance. As a result, the abnormality detection device 10 can detect an abnormality of the target device 2 with a high level of accuracy.

Third Embodiment

Next, an abnormality detection system 1 and an abnormality detection device 10 according to a third embodiment of the present disclosure will be described with reference to FIG. 8.

Components in common with those in the first and second embodiments will be denoted by the same reference numerals and sings, and detailed description thereof will be omitted.

Figure 8:
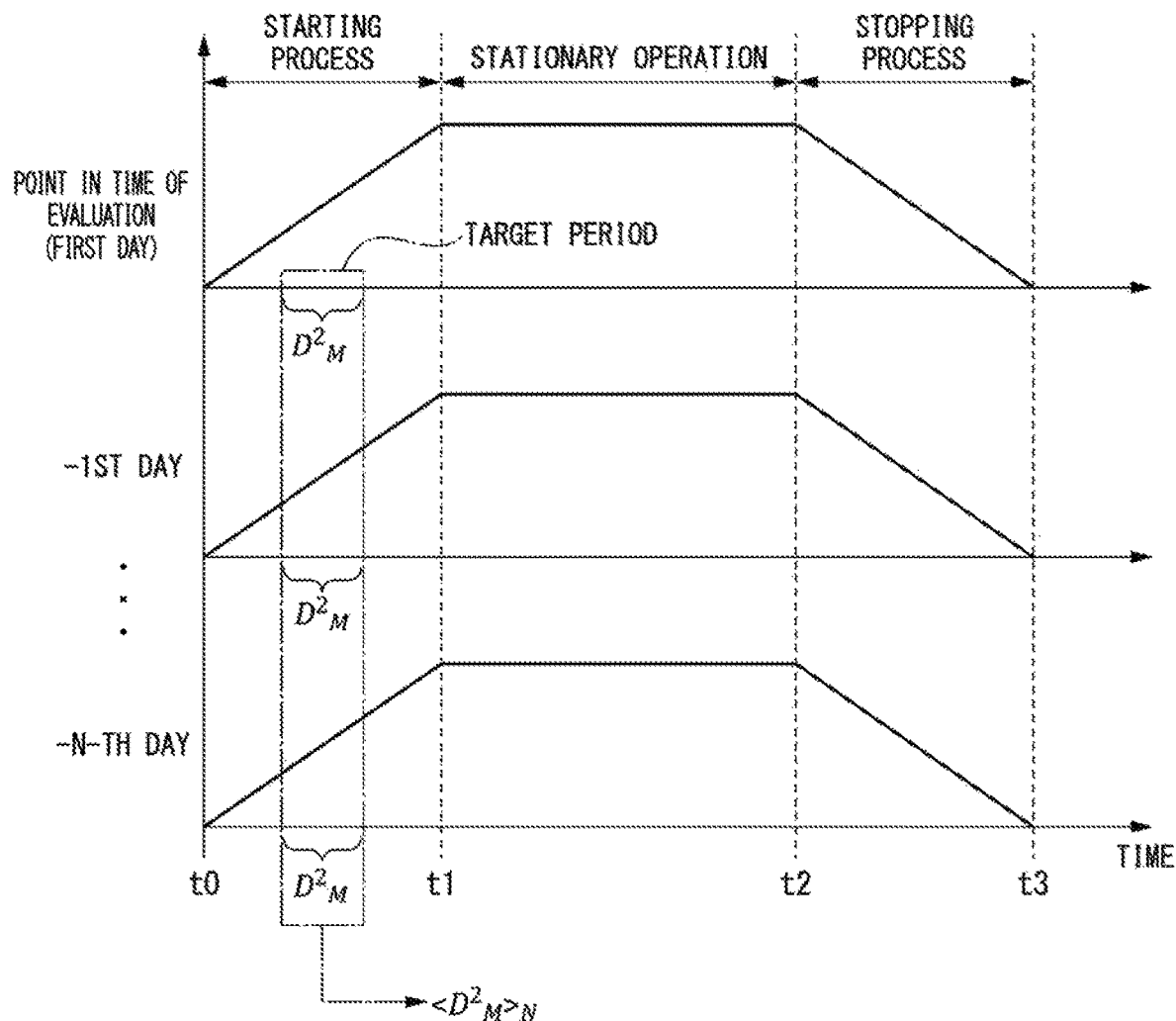
FIG. 8 is a diagram showing an example of an operation cycle of a target device according to a third embodiment.

FIG. 8 is a diagram showing an example of an operation cycle of a target device according to the third embodiment.

In the present embodiment, for example, the target device 2 is a gas turbine of a gas turbine power generation plant. In the gas turbine power generation plant, as shown in FIG. 8, it is assumed that the gas turbine is started and stopped in response to day and night power demands. That is, in the example of FIG. 8, the gas turbine repeats three operation states every day. The operation states area "starting process" indicating an operation state during starting processing, a "stationary operation" in which an operation is continued under a fixed condition, and a "stopping process" indicating an operation state during preparation for stopping.

In addition, a measured value measured in the gas turbine changes depending on an operation state. For this reason, in the present embodiment, the Mahalanobis distance calculation unit 121 prepares a different unit space in advance according to an operation state of the gas turbine and calculates a Mahalanobis distance on the basis of the unit spaces for the respective operation states. Therefore, a storage medium 13 stores, in advance, a starting unit space constituted by a measured value y acquired during the "starting process", a stationary operation unit space constituted by a measured value y acquired during the "stationary operation", and a stopping unit space constituted by a measured value y acquired during the "stopping process".

Here, a case where the abnormality detection device 10 detects an abnormality during the "starting process" of the gas turbine (target device 2) will be described. In a case where an operation state of the gas turbine is a "starting process", the Mahalanobis distance calculation unit 121 executes a process S2 of calculating a Mahalanobis distance in the starting process using a starting unit space (FIG. 6). In this case, the Mahalanobis distance calculation unit 121 calculates a Mahalanobis distance of a measured value y acquired in the starting process (time t0 to t1) using a starting unit space at a timing when the starting process is terminated (time t1 in FIG. 8).

In addition, the moving average calculation unit 122 extracts a plurality of Mahalanobis distances calculated in a period matching an operation state (the entirety or a portion (for example, a period in which a power generation output is 30% to 50%, or the like) of the "starting process") of the gas turbine at a point in time of evaluation (for example, "the first day" in FIG. 8) among a plurality of Mahalanobis distances calculated in the past predetermined period in the process S3 of calculating a moving average value. It is assumed that the number of samples N of a Mahalanobis distance used for taking a moving average is set to "10" in advance. In this case, the moving average calculation unit 122 extracts a Mahalanobis distance in a "starting process" on the first day which is a point in time of evaluation, a Mahalanobis distance in a "starting process" on the −1st day, . . . and a Mahalanobis distance in a "starting process" on the −N-th day from the storage medium 13. For this reason, the predetermined period indicates a period to a day before N days from a day when a Mahalanobis distance in the latest "starting process" is calculated (the first day). In addition, the moving average calculation unit 122 takes a moving average of square values of the extracted Mahalanobis distances. In addition, the moving average calculation unit 122 outputs a square root of a moving average value to an abnormality determination unit 123.

Next, the abnormality determination unit 123 executes a process S4 of comparing the square root of the moving average value calculated by the moving average calculation unit 122 with a predetermined threshold value to determine whether or not an abnormality has occurred (FIG. 6). The subsequent operations are the same as those in the first and second embodiments.

Meanwhile, the abnormality detection device 10 may perform the same processing as above even when an operation state of the gas turbine is a "stopping process". Further, there may be a plurality of periods in which the above-described procedure is performed in a "starting process". Specifically, assuming that the above-described procedure is performed for a period from 30% to 40% of a power generation output, the above-described procedure may be additionally performed for a period from 60% to 70% of a power generation output. The abnormality detection device 10 can improve the accuracy of determination of an abnormality by narrowing down a period for extracting a Mahalanobis distance to one period or a plurality of periods of a certain operation state, for example, according to the range of a power generation output.

In this manner, the abnormality detection device 10 can reduce a variation in a Mahalanobis distance for each operation state of the target device 2. Thereby, even when the state of the target device 2 greatly changes depending on an operation state, it is possible to detect an abnormality for each operation state with a high level of accuracy.

Fourth Embodiment

Next, an abnormality detection system 1 and an abnormality detection device 10 according to a fourth embodiment of the present disclosure will be described with reference to FIG. 9.

Components in common with those in the first to third embodiments will be denoted by the same reference numerals and sings, and detailed description thereof will be omitted.

Figure 9:
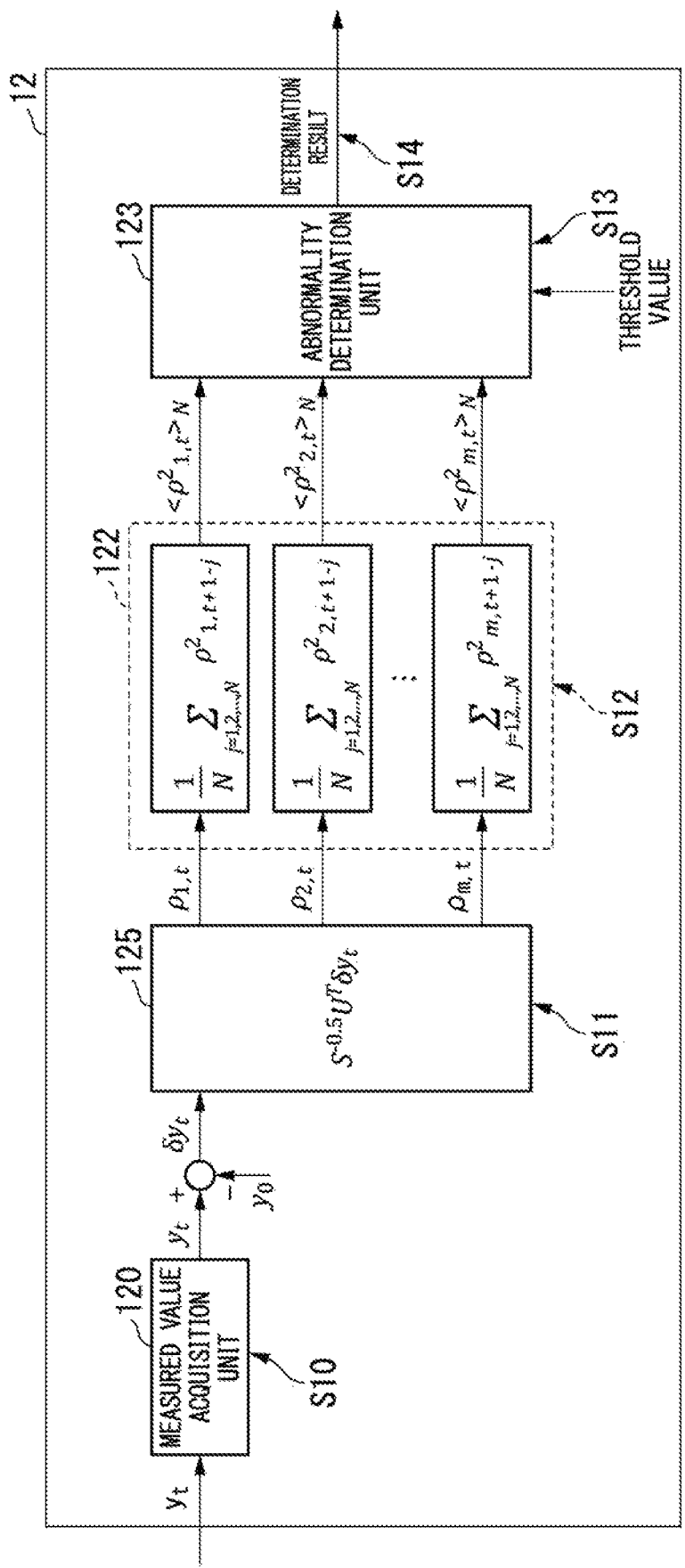
FIG. 9 is a diagram showing a functional configuration of an abnormality detection device according to a fourth embodiment.

FIG. 9 is a diagram showing a functional configuration of the abnormality detection device according to the fourth embodiment.

As shown in FIG. 9, a processor 12 of the abnormality detection device 10 according to the present embodiment has functions of a measured value acquisition unit 120, a moving average calculation unit 122, an abnormality determination unit 123, and a component acquisition unit 125.

First, description will be given of a process of setting a threshold value for the abnormality detection device 10 to determine whether or not an abnormality has occurred in a target device 2 as preparation before determination of an abnormality of the target device 2.

A component acquisition unit 125 performs singular value decomposition of a variance-covariance matrix $Q_0$ of a measured value y of the target device 2 in a normal state to obtain matrices U, S, and V as shown in the following Equation (12). In a case where the order of a measured value $y_t$ is m, the size of each of the matrices U, S, and V is m×m. Since the variance-covariance matrix is a symmetric matrix, V=U.

[Math. 12]

$$USV^T \leftarrow Q_0 \qquad (12)$$

In addition, the component acquisition unit 125 decomposes a measured value y in a normal state into components $\rho_i$ (i=1, 2, . . . , m) by using a singular vector (matrix U) and a singular value (a diagonal component of the matrix S) as shown by the following Equation (13).

[Math. 13]

$$\rho = \begin{bmatrix} \rho_1 \\ \vdots \\ \rho_m \end{bmatrix} = S^{-0.5} U^T (y - y_0) \qquad (13)$$

A square of a component $\rho_i$ (i=1, 2, . . . , m) of ρ which is an m-dimensional vector is expressed as $\rho^2$. Here, $\rho^2$ is expressed as the following Equation (14).

[Math. 14]

$$\rho^2 = \begin{bmatrix} \rho_1^2 \\ \vdots \\ \rho_m^2 \end{bmatrix} \quad (14)$$

The abnormality determination unit 123 calculates an average and a variance of $\rho^2$ from a measured value y in a normal state by the following Equations (15) and (16). In principle, all values of elements of an average $\rho_0^2$ are "1".

[Math. 15]

$$\rho_{0_i}^2 = E[\rho_i^2], (i=1,2,\ldots,m) \quad (15)$$

[Math. 16]

$$\sigma_{\rho_i}^2 = E[(\rho_i^2 - \rho_{0_i}^2)^2], (i=1,2,\ldots,m) \quad (16)$$

The abnormality determination unit 123 sets a threshold value at the time of determining an abnormality on the basis of the variance of $\rho^2$ calculated in the above-described Equation (16). For example, the abnormality determination unit 123 set a value which is five times to ten times a variance corresponding to each element of $\rho^2$ as a threshold value for each of elements $\rho_i^2$ (i=1, 2, ..., m) of $\rho^2$.

Next, a process in which the abnormality detection device 10 determines whether or not an abnormality has occurred in the target device 2 will be described.

First, the measured value acquisition unit 120 executes a process S10 of acquiring a plurality of types of measured values $y_t$ at a certain time t (a point in time of evaluation) from the target device 2 (measured value acquisition process). The process S10 is the same as the process S (FIG. 2) in the first embodiment.

The component acquisition unit 125 executes a process S11 of obtaining a component $\rho_t$ for each singular vector of a matrix based on a measured value $y_t$ acquired by the measured value acquisition unit 120 (component acquisition process). Specifically, the component acquisition unit 125 decomposes the measured value $y_t$ into components $\rho_{i,t}$ (i=1, 2, ..., m) using a singular vector (matrix U) and a singular value (a diagonal component of a matrix S) of a measured value y in a normal state as shown in the following Equation (17).

[Math. 17]

$$\rho = \begin{bmatrix} \rho_1 \\ \vdots \\ \rho_m \end{bmatrix} = S^{-0.5} U^T \delta y_t \quad (17)$$

In addition, the component acquisition unit 125 stores and accumulates the component $\rho_{i,t}$ (i=1, 2, ..., m) of the measured value $y_t$ obtained in the above-described Equation (17) in the storage medium 13.

The moving average calculation unit 122 calculates a moving average for a time with respect to an element $\rho_{(i,t)}^2$ (i=1, 2, ..., m) at a time t. In the present embodiment, the moving average calculation unit 122 executes a process S12 of extracting N components $\rho_i$ (i=1, 2, ..., m) acquired in the past predetermined period from a point in time of evaluation (time t) of the target device 2 and calculating a moving average value of $\rho^2$ obtained by squaring each of the extracted components $\rho_i$ (i=1, 2, ..., m) (moving average calculation process).

Specifically, the moving average calculation unit 122 extracts N components $\rho_i$ (i=1, 2, ..., m) in order from the latest component among the plurality of components $\rho_i$ (i=1, 2, ..., m) stored in the storage medium 13. For example, when "N=10", components $\rho_i$ (i=1, 2, ..., m) acquired at each of the times t, t–1, t–2, ..., and t–9 are extracted. In addition, the moving average calculation unit 122 averages N pieces of $\rho^2$ obtained by squaring the extracted components $\rho_i$ (i=1, 2, ..., m) as shown in the following Equation (18).

[Math. 18]

$$\langle \rho_{i,t}^3 \rangle_N = \frac{1}{N} \sum_{j=1,2,\ldots,N} \rho_{i,t+1-j}^2, (i=1,2,\ldots,m) \quad (18)$$

The abnormality determination unit 123 executes a process S13 of determining whether or not an abnormality has occurred in the target device 2 on the basis of the moving average vector calculated by the moving average calculation unit 122 (abnormality determination process). Specifically, the abnormality determination unit 123 compares each of the elements of the moving average vector calculated by the moving average calculation unit 122 with a threshold value for each elements which is set in advance. For example, in a case where there are one or more elements larger than the threshold value, the abnormality determination unit 123 determines that an abnormality has occurred din the target device 2. On the other hand, in a case where all of the elements are equal to or less than the threshold value, the abnormality determination unit 123 determines that the target device 2 is normal.

In addition, the abnormality determination unit 123 executes a process S14 of transmitting a determination result to the control device 3 (determination result transmission process). The process is the same as the process S5 (FIG. 2) in the first embodiment.

A Mahalanobis distance is, in principle, the sum of the elements of $\rho$ as in the following Equation (19).

[Math. 19]

$$D_M(\delta y) = \sqrt{\sum_{i=1,2,\ldots,m} \rho_i^2} \quad (19)$$

When a certain abnormality has occurred, values of some of the elements of the component vector $\rho$ greatly change due to the abnormality, and values of some of the other elements do not change. For example, it is assumed that $\rho$ is five-dimensional, the value thereof in a normal state is $[1,1,1]^T$, and the value thereof in an abnormal state is $[2,1,1,1,1]^T$. In this case, a Mahalanobis distance in a normal state is "2.2", and a Mahalanobis distance in an abnormal state is "2.8". That is, the Mahalanobis distance in an abnormal state changes to 1.26 times that in a normal state. On the other hand, focusing on a first element of $\rho$, the value thereof is "1" in a normal state and "2" in an abnormal state, and thus a change ratio is doubled. The abnormality detection device 10 according to the present embodiment determines an abnormality focusing on each of the elements of the component vector ρ in this manner, and thus an ability to detect an abnormality of the target device 2 is improved.

Fifth Embodiment

Next, an abnormality detection system 1 and an abnormality detection device 10 according to a fifth embodiment of the present disclosure will be described with reference to FIG. 10.

Components in common with those in the first to fourth embodiments will be denoted by the same reference numerals and signs, and detailed description thereof will be omitted.

Figure 10:
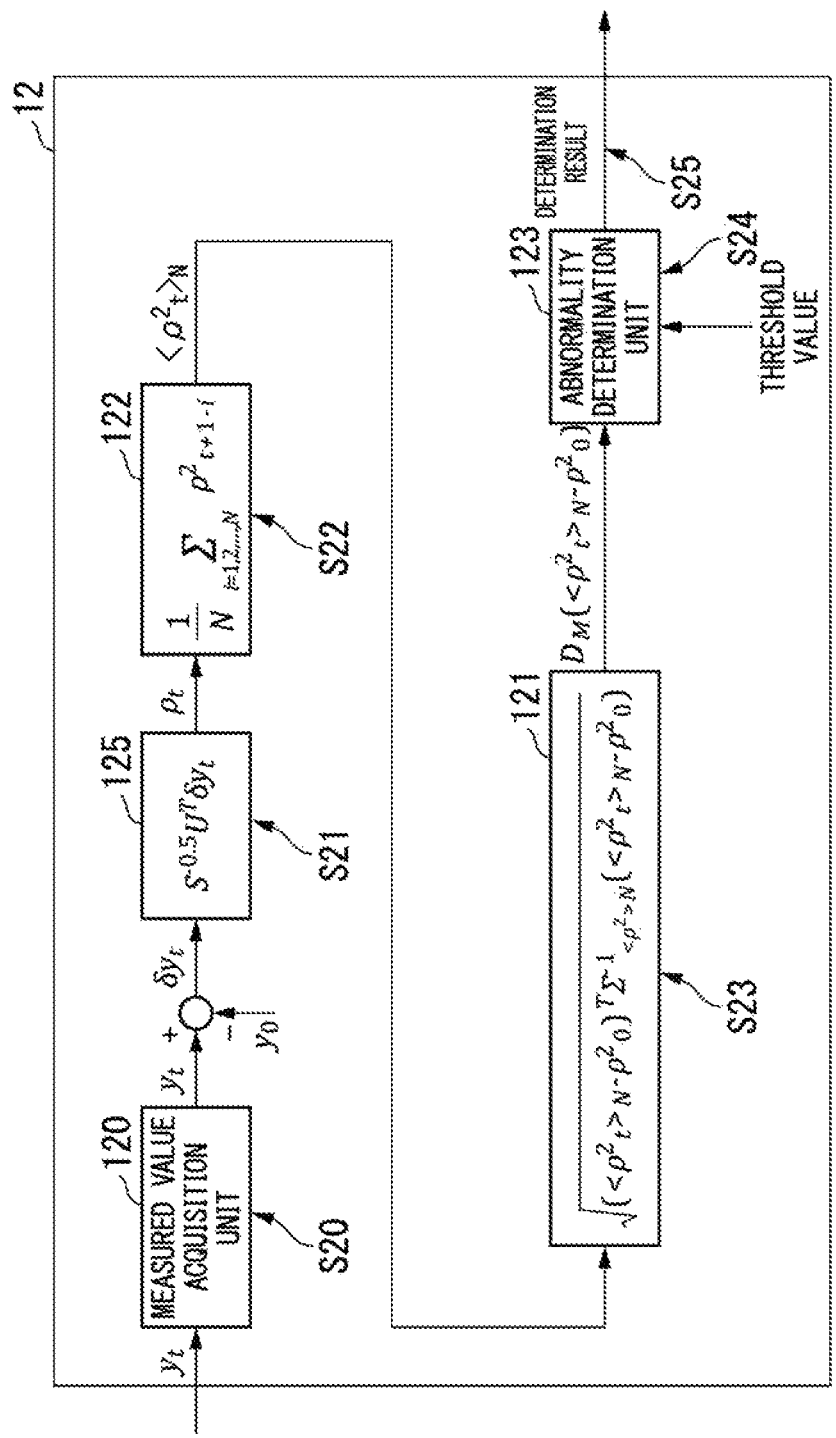
FIG. 10 is a diagram showing a functional configuration of an abnormality detection device according to a fifth embodiment.

FIG. 10 is a diagram showing a functional configuration of the abnormality detection device according to the fifth embodiment.

As shown in FIG. 10, a processor 12 of the abnormality detection device 10 according to the present embodiment further has a function of a Mahalanobis distance calculation unit 121 in addition to functions of a measured value acquisition unit 120, a moving average calculation unit 122, an abnormality determination unit 123, and a component acquisition unit 125.

The abnormality detection device 10 according to the present embodiment determines whether or not an abnormality has occurred in a target device 2 on the basis of a Mahalanobis distance. Meanwhile, before a Mahalanobis distance is calculated, the component acquisition unit 125 obtains $\rho^2$ by squaring each of components $\rho_i$ (i=1, 2, ..., m) of a measured value y which is a normal value using matrices U, S, and V obtained by performing singular value decomposition of a variance-covariance matrix $Q_0$ of the measured value y of the target device 2 in a normal state as shown in the above-described Equations (12) to (15), similar to the fourth embodiment.

The moving average calculation unit obtains N moving averages for a time of $\rho^2$. The Mahalanobis distance calculation unit 121 calculates an average and a variance by the following Equations (20) and (21) with respect to the moving averages.

[Math. 20]

$$\rho_0^2 = E[(\rho^2)_N] \qquad (20)$$

[Math. 21]

$$\Sigma_{(\rho^2)_N} = E[((\rho^2)_N - \rho_0^2)^2] \qquad (21)$$

The abnormality detection device 10 according to the present embodiment performs a process of determining an abnormality of the target device 2 as follows by using the average and the variance calculated by the above-described Equations (20) and (21).

First, the measured value acquisition unit 120 executes a process S20 of acquiring a plurality of types of measured values $y_t$ from the target device 2 at a certain time t (a point in time of evaluation) (measured value acquisition process). The process S20 is the same as the process S10 (FIG. 9) in the fourth embodiment.

The component acquisition unit 125 executes a process S21 of obtaining a component $\rho_t$ for each singular vector of a matrix based on a measured value $y_t$ acquired by the measured value acquisition unit 120 (component acquisition process), similar to the fourth embodiment. The process S21 is the same as the process S11 (FIG. 9) in the fourth embodiment.

The moving average calculation unit 122 executes a process S22 of calculating N moving averages for a time of $\rho^2$ obtained by squaring a component $\rho_{i,t}$ of $\rho_t$ (moving average calculation process).

The Mahalanobis distance calculation unit 121 executes a process S23 of calculating a Mahalanobis distance by the following Equation (22) from the latest moving averages of $\rho^2$ at the time t calculated by the moving average calculation unit 122 (Mahalanobis distance calculation process).

[Math. 22]

$$D_M(\langle\rho_t\rangle_N^2 - \rho_0^2) = \sqrt{(\langle\rho_t\rangle_N^2 - \rho_0^2)^T \Sigma_{(\rho^2)_N}^{-1} (\langle\rho_t\rangle_N^2 - \rho_0^2)} \qquad (22)$$

The abnormality determination unit 123 executes a process S24 of determining whether or not an abnormality has occurred in the target device 2 on the basis of the Mahalanobis distance calculated by the Mahalanobis distance calculation unit 121 (abnormality determination process). Specifically, in a case where the Mahalanobis distance is larger than a predetermined threshold value, the abnormality determination unit 123 determines that an abnormality has occurred in the target device 2. On the other hand, in a case where the Mahalanobis distance is equal to or less than the predetermined threshold value, it is determined that the target device 2 is normal.

In addition, the abnormality determination unit 123 executes a process S25 of transmitting a determination result to a control device 3 (determination result transmission process). The process is the same as the process S14 (FIG. 9) in the fourth embodiment.

Thereby, the abnormality detection device 10 can collectively determine an abnormality for all of the pieces of $\rho^2$ using the Mahalanobis distance. For this reason, the abnormality detection device 10 can more simplify an abnormality determination process than that in the fourth embodiment.

Sixth Embodiment

Next, an abnormality detection system 1 and an abnormality detection device 10 according to a sixth embodiment of the present disclosure will be described with reference to FIG. 11.

Components in common with those in the first to fifth embodiments will be denoted by the same reference numerals and sings, and detailed description thereof will be omitted.

Figure 11:
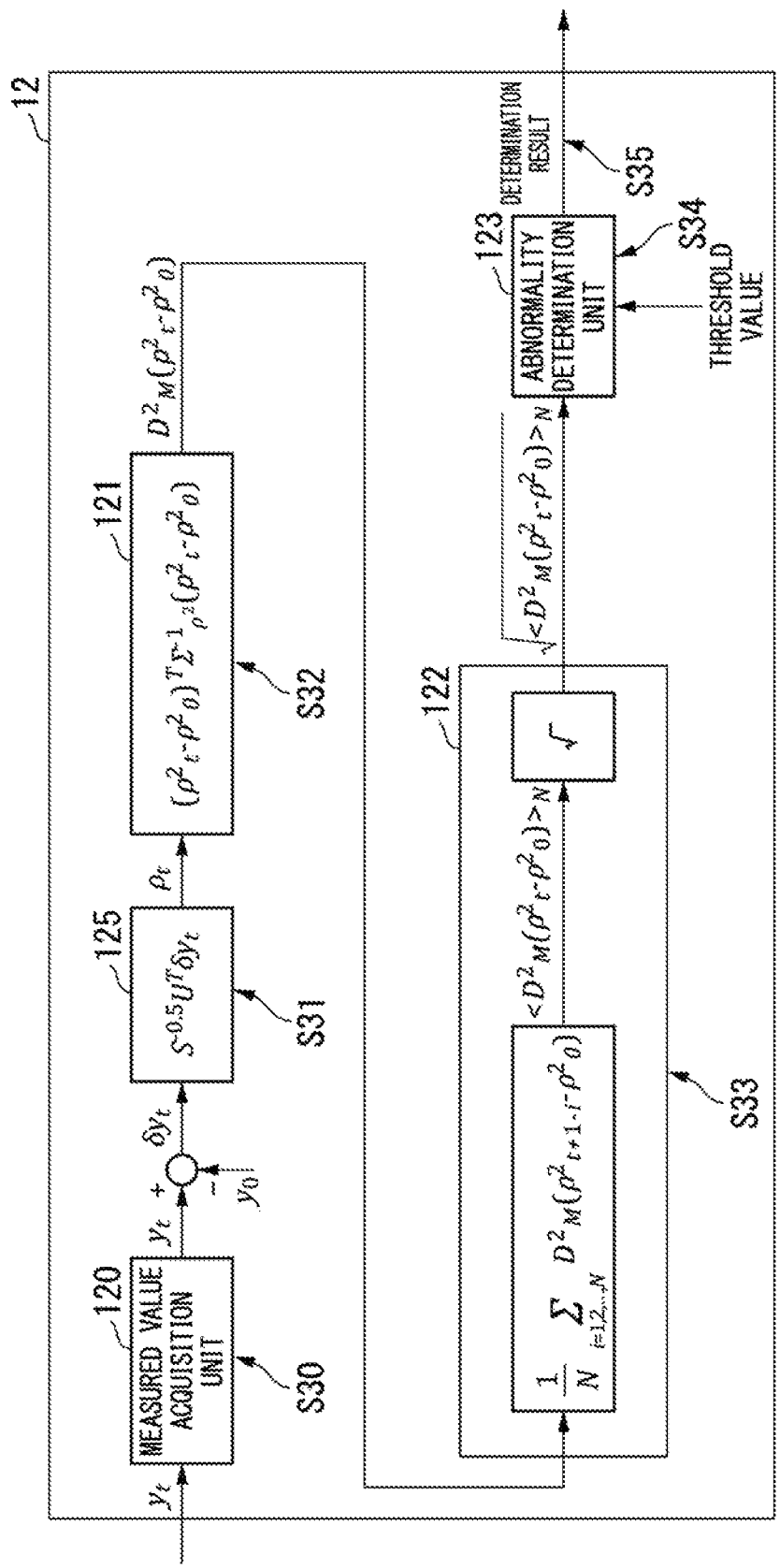
FIG. 11 is a diagram showing a functional configuration of an abnormality detection device according to a sixth embodiment.

FIG. 11 is a diagram showing a functional configuration of the abnormality detection device according to the sixth embodiment.

As shown in FIG. 11, a processor 12 of the abnormality detection device 10 according to the present embodiment has functions of a measured value acquisition unit 120, a Mahalanobis distance calculation unit 121, a moving average calculation unit 122, an abnormality determination unit 123, and a component acquisition unit 125, similar to the fifth embodiment.

The abnormality detection device 10 according to the present embodiment determines whether or not an abnormality has occurred in a target device 2 on the basis of a Mahalanobis distance. Meanwhile, before a Mahalanobis distance is calculated, the component acquisition unit 125 obtains $\rho^2$ by squaring each of components $\rho_i$ (i=1, 2, ..., m) of a measured value y which is a normal value using matrices U, S, and V obtained by performing singular value decomposition of a variance-covariance matrix $Q_O$ of the measured value y of the target device 2 in a normal state as shown in the above-described Equations (12) to (15), similar to the fourth and fifth embodiments.

The Mahalanobis distance calculation unit 121 calculates an average and a variance of $\rho^2$ from a measured value y in a normal state by the following Equations (23) and (24). Meanwhile, in the present embodiment, unlike the fifth embodiment, a moving average value of $\rho^2$ is not used when an average and a variance are calculated. In principle, all values of elements having an average $\rho_0{}^2$ are "1", and a variance $\Sigma\_\rho^2$ is a unit matrix.

[Math. 23]

$$\rho_0{}^2 = E[\rho^2] \tag{23}$$

[Math. 24]

$$\rho_\rho{}^2 = E[(\rho^2 - \rho_0{}^2)^2] \tag{24}$$

The abnormality detection device 10 according to the present embodiment performs a process of determining an abnormality of the target device 2 as follows by using the average and the variance calculated in the above-described Equations (23) and (24).

First, the measured value acquisition unit 120 executes a process S30 of acquiring a plurality of types of measured values $y_t$ at a certain time t (a point in time of evaluation) from the target device 2 (measured value acquisition process). The process S30 is the same as the process S10 (FIG. 9) in the fourth embodiment.

The component acquisition unit 125 executes a process S31 of obtaining a component $\rho_t$ for each singular vector of a matrix based on a measured value $y_t$ acquired by the measured value acquisition unit 120 (component acquisition process), similar to the fourth embodiment. The process S31 is the same as the process S11 (FIG. 9) in the fourth embodiment.

The Mahalanobis distance calculation unit 121 executes a process S32 of calculating a Mahalanobis distance by the following Equation (25) from a component $\rho_t{}^2$ at a time t (Mahalanobis distance calculation process).

[Math. 25]

$$D_M(\rho_t^2 - \rho_0^2) = \sqrt{(\rho_t^2 - \rho_0^2)^T \Sigma_{\rho^2}^{-1}(\rho_t^2 - \rho_0^2)} \tag{25}$$

In addition, the Mahalanobis distance calculation unit 121 stores and accumulates the calculated Mahalanobis distance in a storage medium 13. Meanwhile, in the next process of the moving average calculation unit 122, a square value of the Mahalanobis distance is used. For this reason, the Mahalanobis distance calculation unit 121 according to the present embodiment may calculate a square value ("$D_M{}^2$ ($\rho_t{}^2 - \rho_0{}^2$)") of a Mahalanobis distance as shown in FIG. 11 and store the calculated square value in the storage medium 13.

The moving average calculation unit 122 executes a process S33 of extracting N Mahalanobis distances calculated in the past predetermined period (a period before N steps) from the time t of the target device 2 and calculating a moving average value of a square value of each of the extracted Mahalanobis distances (moving average calculation process).

Meanwhile, in the present embodiment, the moving average calculation unit 122 extracts N Mahalanobis distances in order from the latest Mahalanobis distance among a plurality of Mahalanobis distances stored in the storage medium 13. For example, when "N=10", a Mahalanobis distance calculated at each of times t, t-1, t-2, . . . , and t-9 is extracted. In addition, the moving average calculation unit 122 averages square values of the extracted N Mahalanobis distances as shown in the following Equation (26).

[Math. 26]

$$\langle D_M(\rho_t^2 - \rho_0^2)\rangle_N = \frac{1}{N} \sum_{i=1,2,\ldots,N} D_M^2(\rho_{t+i-i}^2 - \rho_0^2) \tag{26}$$

In addition, the moving average calculation unit 122 outputs a square root of a moving average value to the abnormality determination unit 123 as a value for determining an abnormality, as shown in FIG. 11.

The abnormality determination unit 123 executes a process S34 of determining whether or not an abnormality has occurred in the target device 2 on the basis of the moving average value calculated by the moving average calculation unit 122 (abnormality determination process).

Specifically, the abnormality determination unit 123 compares the square root of the moving average value which is output from the moving average calculation unit 122 with a predetermined threshold value to determine whether or not an abnormality has occurred. In a case where the square root of the moving average value is larger than the predetermined threshold value, the abnormality determination unit 123 determines that an abnormality has occurred in the target device 2. On the other hand, in a case where the square root of the moving average value is equal to or less than the predetermined threshold value, the abnormality determination unit 123 determines that the target device 2 is normal.

In addition, the abnormality determination unit 123 executes a process S35 of transmitting a determination result to a control device 3 (determination result transmission process).

The abnormality detection device 10 according to the present embodiment can reduce effort of calculation as compared with the fourth embodiment by calculating a value related to the determination of an abnormality as described above. For this reason, it is possible to improve a processing speed of the abnormality detection device 10.

Seventh Embodiment

Next, an abnormality detection system 1 and an abnormality detection device 10 according to a seventh embodiment of the present disclosure will be described with reference to FIG. 12.

Meanwhile, the present embodiment relates to the fourth to sixth embodiments. Components in common with those in the fourth to sixth embodiments will be denoted by the same reference numerals and signs, and detailed description thereof will be omitted.

In the above-described fourth to sixth embodiments, the abnormality detection device 10 performs singular value decomposition of a variance-covariance matrix $Q_O$ of a measured value y in a normal state to obtain matrices U, S, and V as shown in the above-described Equation (12). In addition, as shown in the above-described Equation (13), the measured value y in a normal state is decomposed into components $\rho_i$ (i=1, 2, ..., m) using a singular vector (matrix U) and a singular value (a diagonal component of the matrix S).

In this case, the matrix S is a matrix having a singular value as a diagonal component as shown in the following Equation (27). Conventionally, elements $S_i^2$ (i=1, 2 ..., m) of the matrix S are sorted in descending order.

[Math. 27]

$$S = \begin{bmatrix} s_1^2 & 0 & \cdots & 0 \\ 0 & s_2^2 & & 0 \\ \vdots & & \ddots & \vdots \\ 0 & 0 & \cdots & s_m^2 \end{bmatrix} \qquad (27)$$

In addition, $S^{-0.5}$ used in the above-described Equation (13) is expressed as the following Equation (28).

[Math. 28]

$$S^{-0.5} = \begin{bmatrix} s_1^{-1} & 0 & \cdots & 0 \\ 0 & s_2^{-1} & & 0 \\ \vdots & & \ddots & \vdots \\ 0 & 0 & \cdots & s_m^{-1} \end{bmatrix} \qquad (28)$$

Here, a diagonal element of the matrix S may be zero depending on the target device 2 or a target period (FIG. 8). Then, decomposition into p cannot be performed. For this reason, in the abnormality detection device 10 according to the present embodiment, the component acquisition unit 125 performs singular value decomposition after adding artificial noise y to the variance-covariance matrix $Q_0$, as in the following Equation (29).

[Math. 29]

$$USV^T \leftarrow Q_0 + \gamma I \qquad (29)$$

Figure 12:
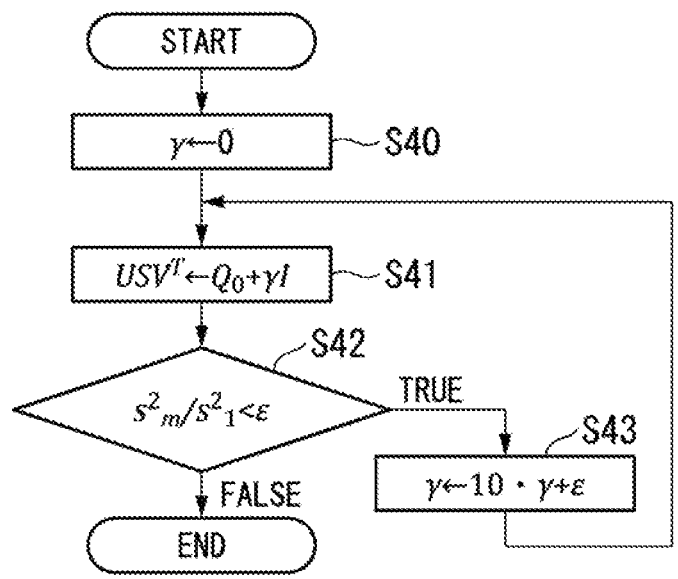
FIG. 12 is a flowchart showing an example of processing of an abnormality detection device according to a seventh embodiment.

FIG. 12 is a flowchart showing an example of processing of the abnormality detection device according to the seventh embodiment.

Determining whether to add artificial noise or not depends on the number of conditions of the matrix S. For this reason, the component acquisition unit 125 according to the present embodiment performs determination as shown in FIG. 12 and performs a process of adjusting a variance-covariance matrix $Q_0$.

First, the component acquisition unit 125 initializes the value of γ to 0 (step S40).

Next, the component acquisition unit 125 corrects the variance-covariance matrix $Q_0$ using γ and then obtains matrices U, S, and V as shown in the above-described Equation (29) (step S41).

Next, the component acquisition unit 125 determines whether or not a value obtained by dividing "$s_m^2$" extracted from the diagonal component of the matrix S by "$s_1^2$" is smaller than a computer epsilon ε (step S42).

In a case where the value of "$s_m^2/s_1^2$" is smaller than E (step S42: TRUE), the component acquisition unit 125 adjusts the value of γ using the following Equation (30) (step S43). In addition, the component acquisition unit 125 adjusts the value of γ and then executes the processes of steps S41 to S42 again.

[Math. 30]

$$\gamma \leftarrow 10 \cdot \gamma + \epsilon \qquad (30)$$

On the other hand, in a case where the value of "$s_m^2/s_1^2$" is equal to or larger than ε (step S42: FALSE), the component acquisition unit 125 terminates the process of adjusting the variance-covariance matrix $Q_0$. In this case, the component acquisition unit 125 executes a process of obtaining a component ρ of a measured value y (the process S11 in FIG. 9, the process S21 in FIG. 10, and the process S31 in FIG. 11) using the matrices U, S, and V obtained by performing singular value decomposition of the variance-covariance matrix $Q_0$ adjusted using γ in step S41.

Thereby, the abnormality detection device 10 can suppress a failure of a process of acquiring a component ρ in the component acquisition unit 125. As a result, the abnormality detection device 10 can improve stability of calculation of numerical values.

(Hardware Configuration of Abnormality Detection Device)

Figure 13:
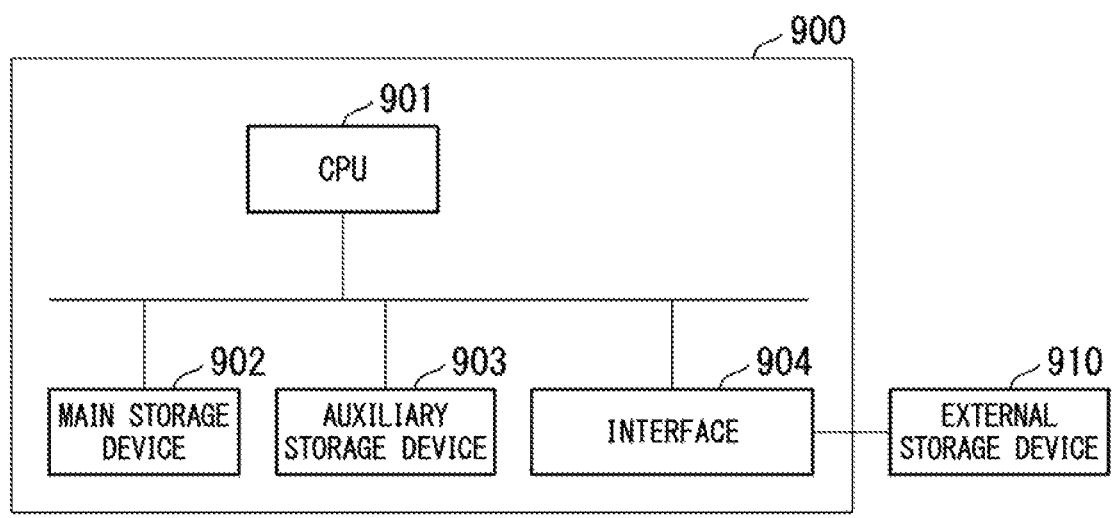
FIG. 13 is a diagram showing an example of a hardware configuration of an abnormality detection device according to an embodiment of the present disclosure.

FIG. 13 is a diagram showing an example of a hardware configuration of an abnormality detection device according to an embodiment of the present disclosure.

Hereinafter, an example of a hardware configuration of an abnormality detection device 10 will be described with reference to FIG. 13.

As shown in FIG. 13, a computer 900 includes a CPU 901, a main storage device 902, an auxiliary storage device 903, and an interface 904.

The abnormality detection device 10 according to any one of the above-described embodiments is mounted in the computer 900. In addition, operations of the above-described processing units are stored in the auxiliary storage device 903 in the format of a program. The CPU 901 (processor 12) reads the program from the auxiliary storage device 903, develops the program to the main storage device 902, and executes the above-described processing in accordance with the program. In addition, the CPU 901 secures a storage region used in various processes by the abnormality detection device 10 in the main storage device 902 in accordance with the program. In addition, the CPU 901 secures a storage region for storing data during processing in the auxiliary storage device 903 (storage medium 13) in accordance with the program.

Examples of the auxiliary storage device 903 include a hard disk drive (HDD), a solid state drive (SSD), a magnetic disc, a magneto-optical disc, a compact disc read only memory (CD-ROM), a digital versatile disc read only memory (DVD-ROM), a semiconductor memory, and the like. The auxiliary storage device 903 may be an internal medium which is directly connected to a bus of the computer 900 or may be an external medium connected to the computer 900 through the interface 904 or a communication line. Further, in a case where the program is distributed to the computer 900 through a communication line, the computer 900 having received the distributed program may develop the program to the main storage device 902 and execute the above-described processing. In at least one embodiment, the auxiliary storage device 903 is a non-transitory tangible storage medium.

In addition, the program may be a program for realizing some of the above-described functions. Further, the program may be a so-called differential file (differential program) capable of realizing the above-described functions in combination with another program which is stored in the auxiliary storage device 903 in advance.

Although some embodiments according to the present disclosure have been described above, those embodiments are described as examples, and do not intend to limit the scope of the invention. These embodiments may be embodied in other various modes, and may be variously omitted, substituted, and modified without departing from the scope of the invention. These embodiments and modification thereof are within the scope and the gist of the invention, and are within the scope of the invention described in the scope of claims and the equivalent thereof.

EXPLANATION OF REFERENCES

1 Abnormality detection system
10 Abnormality detection device
11 Input and output unit
12 Processor
120 Measured value acquisition unit
121 Mahalanobis distance calculation unit
122 Moving average calculation unit
123 Abnormality determination unit
124 Setting unit
125 Component acquisition unit
13 Storage medium
2 Target device
3 Control device

What is claimed is:

1. An abnormality detection device that detects an abnormality of a target device that has a plurality of different operation states including at least a first operation state and a second operation state, the abnormality detection device comprising:
a processor that executes
a process of acquiring a plurality of types of measured values of the target device with a first period of a predetermined sampling cycle,
a process of calculating Mahalanobis distances of the acquired plurality of types of measured values at intervals of the first period,
a process of extracting a plurality of Mahalanobis distances calculated in a second period that is a past predetermined period from a point in time of evaluation of the target device and calculating a moving average value of a square value of each of the extracted Mahalanobis distances,
a process of determining whether or not an abnormality has occurred in the target device on the basis of a square root of the moving average value, and
a process of transmitting a determination result of the target device to a control device,
wherein the target device has an operation cycle in which one operation is completed at intervals of a third period,
wherein the processor sets the length of the second period so as to match the length of the third period, and
wherein when the moving average value is calculated, the processor extracts:
a plurality of Mahalanobis distances calculated in a period in which the target device has been operated in the first operation state during the second period in a case that the target device is operated in the first operation state at the point in time of evaluation of the target device, and
a plurality of Mahalanobis distances calculated in a period in which the target device has been operated in the second operation state during the second period in a case that the target device is operated in the second operation state at the point in time of evaluation of the target device.

2. The abnormality detection device according to claim 1, wherein the processor determines that the target device is abnormal in a case where the square root of the moving average value is larger than a predetermined threshold value.

3. An abnormality detection device that detects an abnormality of a target device that has a plurality of different operation states including at least a first operation state and a second operation state, the abnormality detection device comprising:
a processor that executes
a process of acquiring a plurality of types of measured values of the target device with a first period of a predetermined sampling cycle,
a process of obtaining singular vectors and singular values by performing singular value decomposition of a matrix based on the acquired measured values and acquiring a component for each of the singular vectors based on the singular vectors and the singular values at intervals of the first period,
a process of extracting a plurality of components acquired in a second period that is a past predetermined period from a point in time of evaluation of the target device and calculating a moving average value of a square value of each of the extracted components,
a process of determining whether or not an abnormality has occurred in the target device on the basis of a square root of the moving average value, and
a process of transmitting a determination result of the target device to a control device,
wherein when the moving average value is calculated, the processor extracts:
a plurality of components calculated in a period in which the target device has been operated in the first operation state during the second period in a case that the target device is operated in the first operation state at the point in time of evaluation of the target device, and
a plurality of components calculated in a period in which the target device has been operated in the second operation state during the second period in a case that the target device is operated in the second operation state at the point in time of evaluation of the target device.

4. The abnormality detection device according to claim 3, wherein the processor further executes a process of calculating a Mahalanobis distance based on the moving average value and determines that the target device is abnormal in a case where the Mahalanobis distance calculated on the basis of the moving average value is larger than a predetermined threshold value in the process of determining whether or not an abnormality has occurred.

5. An abnormality detection device that detects an abnormality of a target device that has a plurality of different operation states including at least a first operation state and a second operation state, the abnormality detection device comprising:
a processor that executes
a process of acquiring a plurality of types of measured values of the target device with a first period of a predetermined sampling cycle,
a process of obtaining singular vectors and singular values by performing singular value decomposition of a matrix based on the acquired measured values and calculating a component for each of the singular vectors based on the singular vectors and the singular values at intervals of the first period, a process of calculating a Mahalanobis distance of the calculated component, a process of extracting a plurality of Mahalanobis distances calculated in a second period that is a past predetermined period from a point in time of evaluation of the target device and calculating a moving average value of a square value of each of the extracted Mahalanobis distances, a process of determining whether or not an abnormality has occurred in the target device on the basis of a square root of the moving average value, and a process of transmitting a determination result of the target device to a control device, wherein when the moving average value is calculated, the processor extracts:

a plurality of Mahalanobis distances calculated in a period in which the target device has been operated in the first operation state during the second period in a case that the target device is operated in the first operation state at the point in time of evaluation of the target device, and a plurality of Mahalanobis distances calculated in a period in which the target device has been operated in the second operation state during the second period in a case that the target device is operated in the second operation state at the point in time of evaluation of the target device.

6. An abnormality detection method of detecting an abnormality of a target device that has a plurality of different operation states including at least a first operation state and a second operation state, the abnormality detection method comprising:

acquiring a plurality of types of measured values of the target device with a first period of a predetermined sampling cycle;

calculating Mahalanobis distances of the acquired plurality of types of measured values at intervals of the first period;

extracting a plurality of Mahalanobis distances calculated in a second period that is a past predetermined period from a point in time of evaluation of the target device and calculating a moving average value of a square value of each of the extracted Mahalanobis distances;

determining whether or not an abnormality has occurred in the target device on the basis of a square root of the moving average value; and transmitting a determination result of the target device to a control device, wherein the target device has an operation cycle in which one operation is completed at intervals of a third period, wherein the length of the second period is set so as to match the length of the third period, and wherein when the moving average value is calculated, the processor extracts:

a plurality of Mahalanobis distances calculated in a period in which the target device has been operated in the first operation state during the second period in a case that the target device is operated in the first operation state at the point in time of evaluation of the target device, and a plurality of Mahalanobis distances calculated in a period in which the target device has been operated in the second operation state during the second period in a case that the target device is operated in the second operation state at the point in time of evaluation of the target device.

7. A non-transitory computer-readable medium storing a program which causes a computer of an abnormality detection device detecting an abnormality of a target device that has a plurality of different operation states including at least a first operation state and a second operation state to execute:

a process of acquiring a plurality of types of measured values of the target device with a first period of a predetermined sampling cycle;

a process of calculating Mahalanobis distances of the acquired plurality of types of measured values at intervals of the first period;

a process of extracting a plurality of Mahalanobis distances calculated in a second period that is a past predetermined period from a point in time of evaluation of the target device and calculating a moving average value of a square value of each of the extracted Mahalanobis distances;

a process of determining whether or not an abnormality has occurred in the target device on the basis of a square root of the moving average value; and a process of transmitting a determination result of the target device to a control device, wherein the target device has an operation cycle in which one operation is completed at intervals of a third period, wherein the length of the second period is set so as to match the length of the third period, and wherein when the moving average value is calculated, the processor extracts:

a plurality of Mahalanobis distances calculated in a period in which the target device has been operated in the first operation state during the second period in a case that the target device is operated in the first operation state at the point in time of evaluation of the target device, and a plurality of Mahalanobis distances calculated in a period in which the target device has been operated in the second operation state during the second period in a case that the target device is operated in the second operation state at the point in time of evaluation of the target device.

* * * * *